US012688167B2

(12) United States Patent
Lee et al.

(10) Patent No.: US 12,688,167 B2
(45) Date of Patent: Jul. 21, 2026

(54) DOMAIN-SPECIFIC DATA RECORDS SYNCHRONIZATION

(71) Applicant: Ramp Business Corporation, New York, NY (US)

(72) Inventors: Jaein Lee, New York, NY (US); Ori Ephraim Goldfield, New York, NY (US); Calvin Jun-Gong Lee, Weehawken, NJ (US); Jared Robert Wasserman, New York, NY (US); Diego D. Zaks Barrios, New York, NY (US); Tae Kyung Kong, Bayside, NY (US)

(73) Assignee: Ramp Business Corporation, New York, NY (US)

( * ) Notice: Subject to any disclaimer, the term of this patent is extended or adjusted under 35 U.S.C. 154(b) by 144 days.

(21) Appl. No.: 17/498,664

(22) Filed: Oct. 11, 2021

(65) Prior Publication Data

US 2023/0115112 A1 Apr. 13, 2023

(51) Int. Cl.
| | |
|---|---|
| *G06F 16/21* | (2019.01) |
| *G06F 9/54* | (2006.01) |
| *G06F 16/23* | (2019.01) |
| *G06F 16/25* | (2019.01) |
| *G06Q 20/34* | (2012.01) |

(52) U.S. Cl.
CPC ............ *G06F 16/213* (2019.01); *G06F 9/547* (2013.01); *G06F 16/2365* (2019.01); *G06F 16/25* (2019.01); *G06Q 20/351* (2013.01)

(58) Field of Classification Search
CPC .... G06F 16/213; G06F 16/25; G06F 16/2365; G06F 9/547; G06Q 20/351
See application file for complete search history.

(56) References Cited

U.S. PATENT DOCUMENTS

| | | | | |
|---|---|---|---|---|
| 10,445,311 | B1 * | 10/2019 | Saurabh | .............. H04L 63/1425 |
| 2008/0010365 | A1 * | 1/2008 | Schneider | ............... H04L 63/10 |
| | | | | 709/223 |
| 2013/0232108 | A1 * | 9/2013 | Bostick | ................. G06F 40/143 |
| | | | | 707/693 |
| 2014/0180924 | A1 * | 6/2014 | Ozvat | ................ G06Q 20/4016 |
| | | | | 705/44 |
| 2018/0083851 | A1 * | 3/2018 | Gravenites | .......... H04L 41/0869 |

(Continued)

*Primary Examiner* — Amy Ng
*Assistant Examiner* — Dustin D Eyers
(74) *Attorney, Agent, or Firm* — Fenwick & West LLP

(57) ABSTRACT

A computing system receives a selection of a parameter-setting rule associated with a specific unique identifier and automatically assigns data parameters to the data records according to the parameter-assigning rule. The computing system determines a domain for each data record based on data parameters associated with the occurred instance. A collection of data records is displayed to a user of the computing system. The collection of data records is displayed with a set of third-party defined fields. Values for the set of third-party defined fields are pre-filled based on the parameter-assigning rules. Upon receiving the request to export the collection of data records, a payload corresponding to the collection of data records for the third-party system is created. The payload includes at least the set of third-party defined fields and the domain associated with each data record automatically assigns data records to the corresponding domain in the third-party system.

20 Claims, 11 Drawing Sheets

(56)                  References Cited

U.S. PATENT DOCUMENTS

2019/0361900 A1*  11/2019  Rogynskyy ........... G06F 16/212
2020/0226009 A1*   7/2020  Bachmutsky ......... G06F 9/5038
2022/0214896 A1*   7/2022  Mody ................... G06F 3/0481

* cited by examiner

100

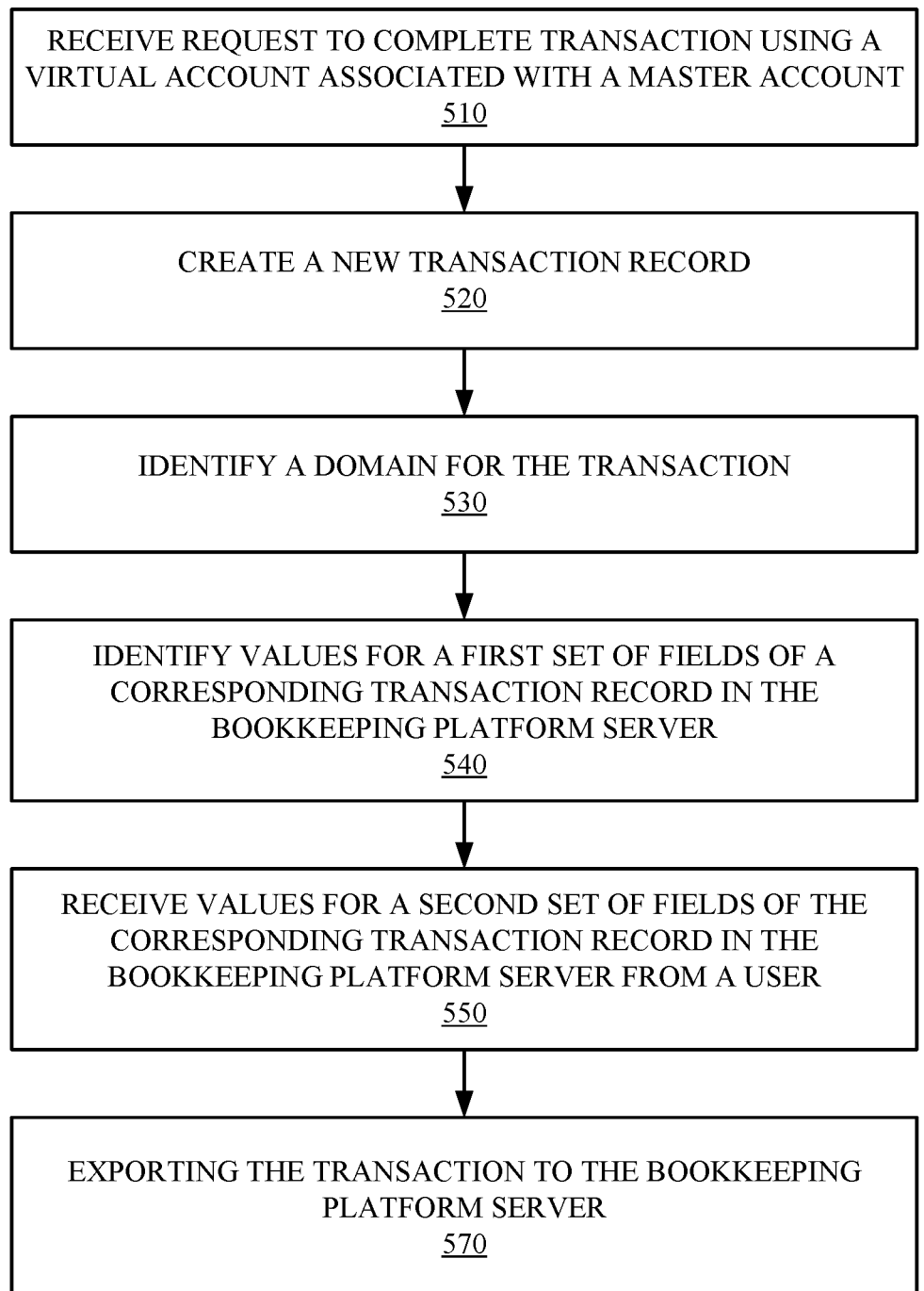

RECEIVE REQUEST TO COMPLETE TRANSACTION USING A
VIRTUAL ACCOUNT ASSOCIATED WITH A MASTER ACCOUNT
510

CREATE A NEW TRANSACTION RECORD
520

IDENTIFY A DOMAIN FOR THE TRANSACTION
530

IDENTIFY VALUES FOR A FIRST SET OF FIELDS OF A
CORRESPONDING TRANSACTION RECORD IN THE
BOOKKEEPING PLATFORM SERVER
540

RECEIVE VALUES FOR A SECOND SET OF FIELDS OF THE
CORRESPONDING TRANSACTION RECORD IN THE
BOOKKEEPING PLATFORM SERVER FROM A USER
550

EXPORTING THE TRANSACTION TO THE BOOKKEEPING
PLATFORM SERVER
570

Card Approval Requests

Search & Filter  Q

| Requester | Card Type | Amount | Auto-Lock Date |
|---|---|---|---|
| 711 { Noah Bowman | Physical | $500 | 12/31/21 |
| 712 { Megan Yen | Digital | $5000 | 8/31/21 |
| Katrim Atiyeh | Physical | $600 | 9/31/21 |
| Tyn Gunn | Digital | $5000 | 10/31/21 |
| Matt Sheek | Physical | $500 | 11/31/21 |
| Katrina Sloan | Digital | $2000 | 7/31/22 |
| Karim Atul | Physical | $600 | 6/31/22 |
| Lewis Drumond | Digital | $100 | 5/31/22 |
| Cameron Lewis | Physical | $500 | 4/31/22 |

710

∨∨

⌂ Insights

⚡ Transactions

▦ Cards

People

Bill Pay

Vendors

Reimburse

Accounting

Card Approval Requests

My Card

Earn $250

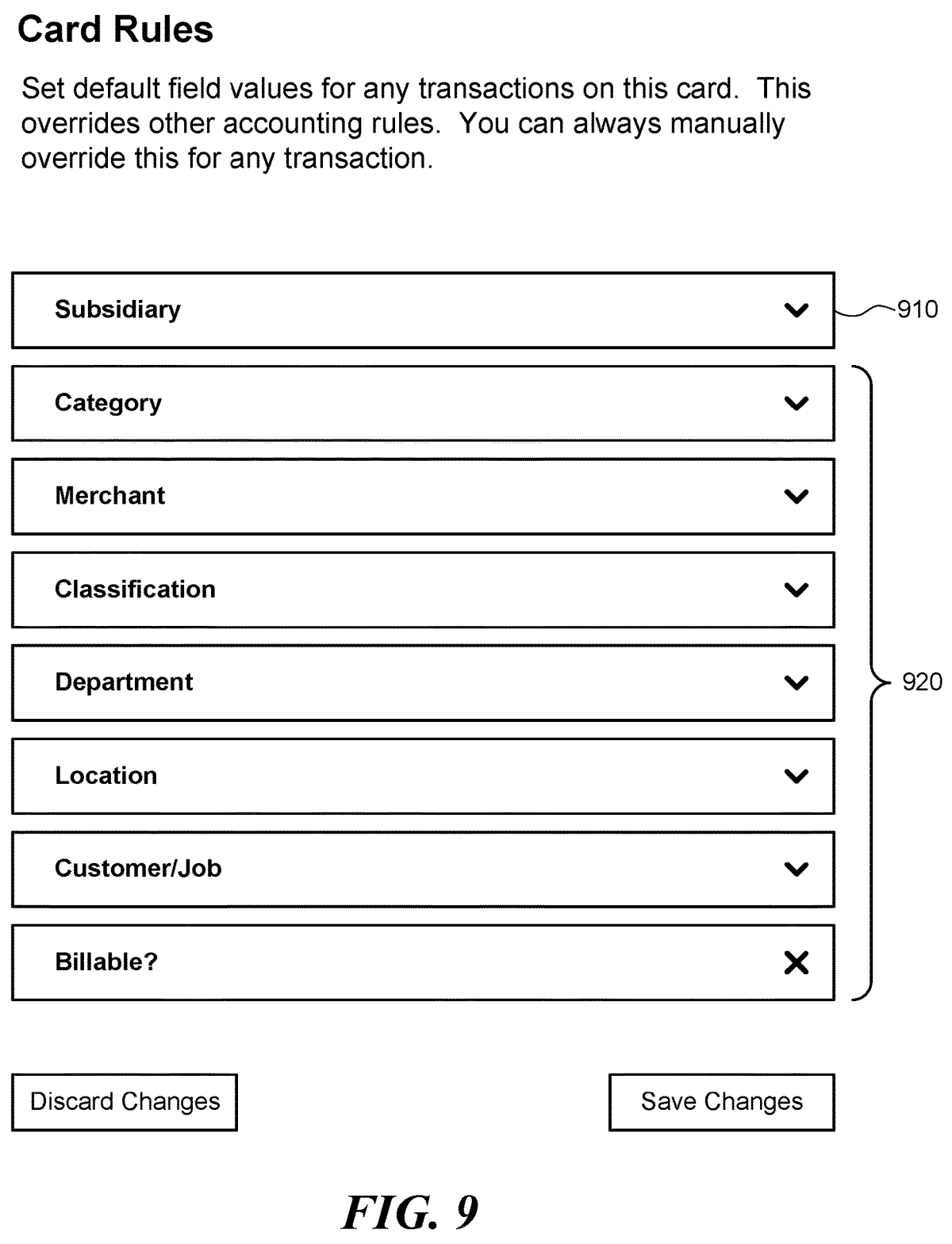

Card Rules

Set default field values for any transactions on this card.  This overrides other accounting rules.  You can always manually override this for any transaction.

| Subsidiary | ∨ | ⌐910 |

| Category | ∨ |
| Merchant | ∨ |
| Classification | ∨ |
| Department | ∨ |
| Location | ∨ |
| Customer/Job | ∨ |
| Billable? | ✕ |

920

| Discard Changes |        | Save Changes |

*FIG. 9*

Client Spend

Specify required fields to be collected from cardholders.

Policy Name

*Enter policy name*

Field requirements:

| Receipt | Required ∨ | for | Transactions Above ∨ | $100.00 |

| Memo | Required ∨ | for | Transactions Above ∨ | $50.00 |

| Subsidiary | Required ∨ | for | All Transactions ∨ |

| Category | Not Required ∨ |

Discard Changes

Save Changes

*FIG. 10*

DOMAIN-SPECIFIC DATA RECORDS SYNCHRONIZATION

TECHNICAL FIELD

The present disclosure generally relates to synchronization of data records between two separate computing systems and, particularly to domain-specific formatting and auto-population of data records for exportation to third-party systems.

BACKGROUND

Organizations nowadays may use a number of separate online systems, each handling a different task. However, in order to streamline or facilitate interoperability between the different systems, users of the online systems may want certain data to be synchronized across the different online systems. However, data records in a first computing system and data records in as second online system may not exactly match each other, or may not have a one to one correspondence. For example, values for certain fields of a data record associated with the same transaction may be stored using different versions of the value (e.g., due to difference in data constraints imposed by each of the systems, or due to differences in how the data is formatted in each of the systems). Moreover, data records of an organization managed through a first online system, may be synchronized with data records in a second online system across multiple domains in the second online system. For instance, an organization may manage the data records in the first online system through a single account but splits the data records into multiple domains in the second online system. This creates incompatibilities between the two online systems, making the synchronization of the data records more difficult to perform.

SUMMARY

Embodiments are related to synchronizing data records between a computing system and an external third-party system. For example, a computing system allows transaction records to be exported to a third-party system (such as bookkeeping system). In one embodiment, a computing system receives a selection of a parameter-setting rule associated with a specific unique identifier. The computing system records an occurrence of an instance associated with the specific unique identifier and creates a specific data record corresponding to the occurrence. The computing system automatically assigns data parameters to the specific data record according to the parameter-assigning rule. Moreover, the computing system determines a domain for the specific data record based at least on one or more data parameters associated with the occurred instance. A graphical user interface (GUI) displaying a collection of data records is displayed to a user of the computing system. The collection of data records is displayed with a set of third-party defined fields that are defined by a third-party system. One or more values for the set of third-party defined fields are pre-filled by the computing system based on one or more parameter-assigning rules associated with each unique identifier and the domain associated with the specific data record. The computing system receives a request to export the collection of data records to the third-party system. Upon receiving the request to export the collection of data records, the computing system creates a payload corresponding to the collection of data records for the third-party system. The payload includes at least the set of third-party defined fields. Moreover, the domain associated with the specific data record specified in the payload automatically assigns the specific data record to the domain in the third-party system.

BRIEF DESCRIPTION OF THE DRAWINGS

Figure (FIG. 1 is a block diagram illustrating an example system environment, in accordance with an embodiment.

FIG. 5 illustrates a flow diagram of a process depicting a computer-implemented process for synchronizing transaction records between a computing server and a bookkeeping platform server, in accordance with an embodiment.

FIG. 7 illustrates an account creation management interface 700, in accordance with an embodiment.

FIG. 9 illustrates a transaction account rules management interface 900, in accordance with an embodiment.

FIG. 10 illustrates a transaction record configuration interface 1000, in accordance with an embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

System Overview

Figure 1:
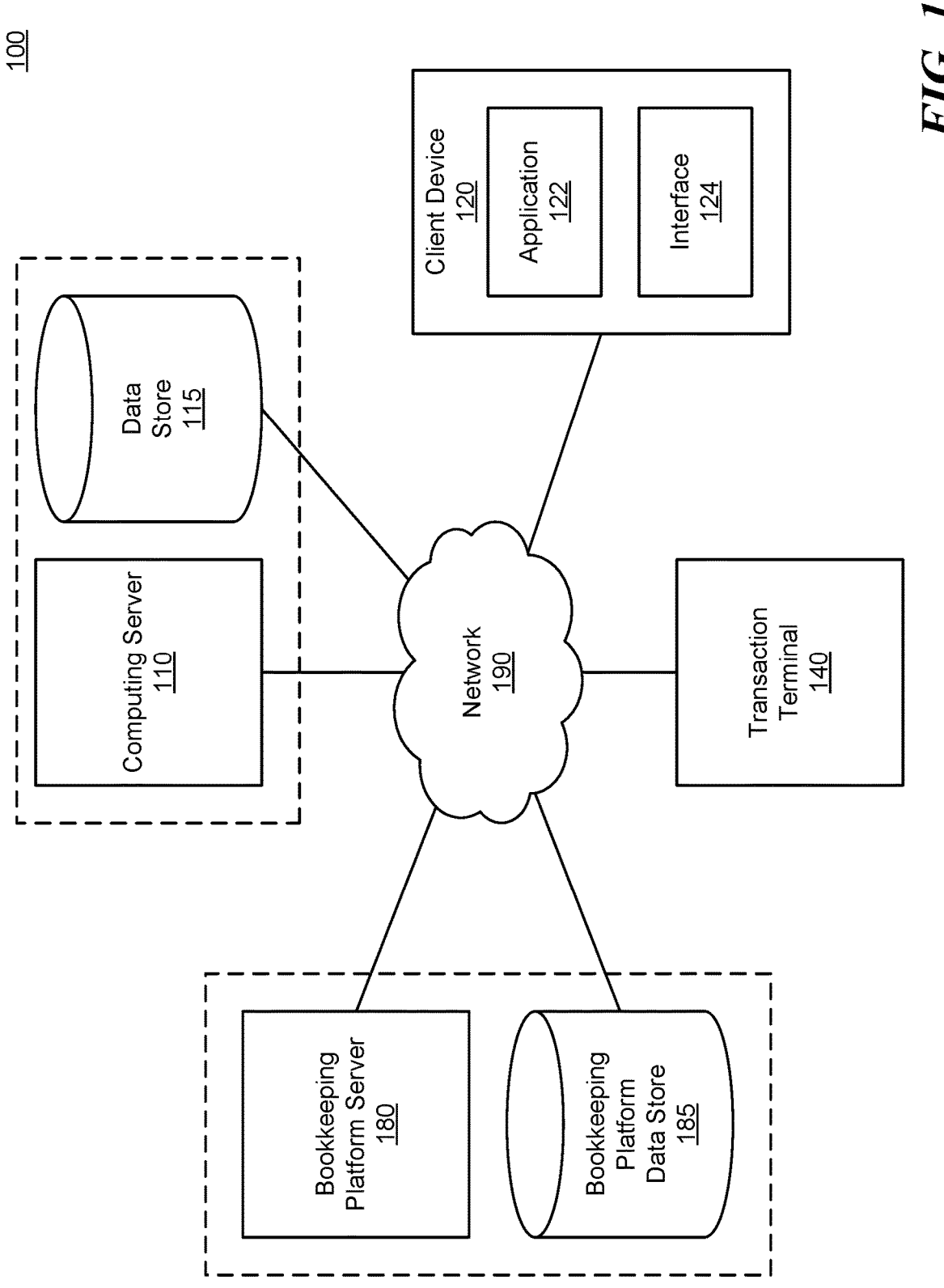

Figure (FIG. 1 is a block diagram that illustrates an example system environment 100, in accordance with an embodiment. The system environment 100 includes a computing server 110, a data store 115, a client device 120, a transaction terminal 140, a bookkeeping platform server 180, and a bookkeeping platform data store 185. The entities and components in the system environment 100 communicate with each other through network 190. In various embodiments, the system environment 100 includes fewer or additional components. In some embodiments, the system environment 100 also includes different components. While each of the components in the system environment 100 is described in a singular form, the system environment 100 may include one or more of each of the components. For example, in many situations, the computing server 110 can communicate with multiple client devices 120 and multiple transaction terminals 140.

The computing server 110 includes one or more computers that perform various tasks related to managing instances associated with various clients of the computing server 110. An instance may be a business transaction such as a credit card transaction, a payment instance, an accounts receivable transaction, an invoice issuance, etc. While credit card transactions are used as examples of instances throughout this disclosure, various features disclosed herein may also apply to other types of instances. A transaction account may be a form of resource access such as a credit card account for accessing credit or a data storage account for accessing digital files. For example, the computing server 110 enables the request and approval of transaction accounts requested by workspace members of an organization (e.g., corporate credit cards). A unique identifier may be associated with a transaction account, such as a credit card account, a payment account, a bank account, an accounts receivable account, an invoice account, etc. For example, the unique identifier may be the credit card number. While credit cards are used as primary examples of transaction accounts throughout this disclosure, various features disclosed herein may also apply to other types of transaction accounts and unique identifiers.

In some embodiments the transaction accounts are virtual accounts that are linked to a master account. For example, the transaction accounts may be aliases for the master account that can be used as if the transaction account were the master account. When a transaction is completed using the transaction account, the transaction is posted to the master account or attributed to the master account. In some embodiments, virtual accounts are digital accounts. That is, the virtual account is associated with a digital token that can be used to complete transactions electronically. Alternatively or in addition, the virtual account may be associated with a physical token (such as a card). The physical token may store information for completing a transaction allowing a terminal to interact with the physical token.

Figure 2:
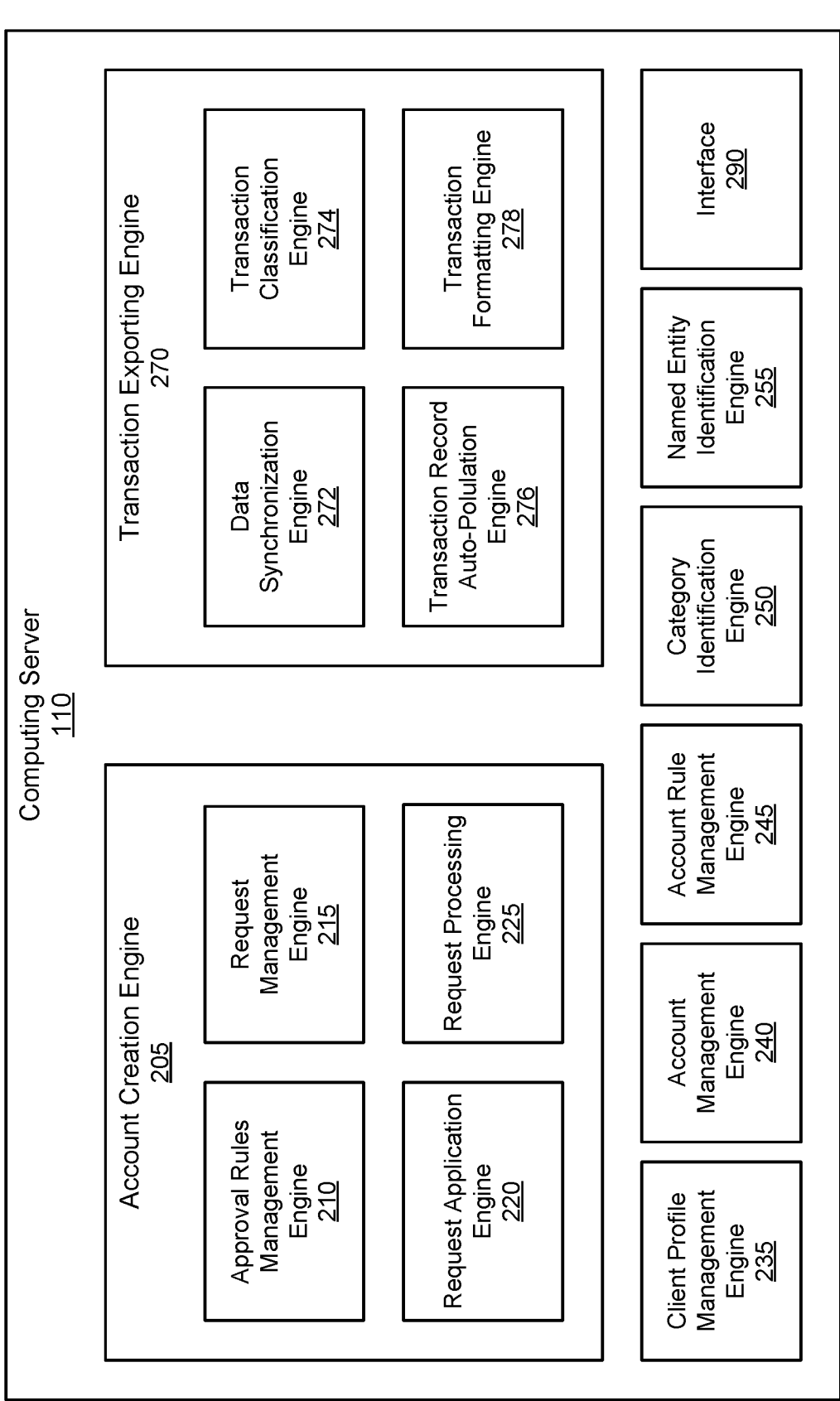
FIG. 2 includes block diagrams illustrating components of an example computing server, in accordance with an embodiment.

In some embodiments, the computing server 110 creates transaction accounts (e.g., credit cards) for an organization client and manages transactions of the transaction accounts of the organization client based on rules set by the client. Rules include pre-authorization and restrictions on certain transactions. In one embodiment, the computing server 110 provides its clients with various payment and spending management services as a form of cloud-based software, such as software as a service (Saas). Examples of components and functionalities of the computing server 110 are discussed in further detail below with reference to FIG. 2. The computing server 110 may provide a SaaS platform for various clients to manage their transaction accounts and transaction rules related to the transaction accounts.

The data store 115 includes one or more computing devices that include memories or other storage media for storing various files and data of the computing server 110. The data stored in the data store 115 includes accounting information, transaction data, credit card profiles, card rules and restrictions, merchant profiles, merchant identification rules, spending records and other related data associated with various clients of the computing server 110.

In various embodiments, the data store 115 may take different forms. In one embodiment, the data store 115 is part of the computing server 110. For example, the data store 115 is part of the local storage (e.g., hard drive, memory card, data server room) of the computing server 110. In some embodiments, the data store 115 is a network-based storage server (e.g., a cloud server). The data store 115 may be a third-party storage system such as AMAZON AWS, DROPBOX, RACKSPACE CLOUD FILES, AZURE BLOB STORAGE, GOOGLE CLOUD STORAGE, etc. The data in the data store 115 may be structured in different database formats such as a relational database using the structured query language (SQL) or other data structures such as a non-relational format, a key-value store, a graph structure, a linked list, an object storage, a resource description framework (RDF), etc. In one embodiment, the data store 115 uses various data structures mentioned above.

A client device 120 is a device that enables the holder of the device 120 to interact with a party, such as managing transactions performed using transaction accounts through an interface of the computing server 110 or the bookkeeping platform server 180 displayed on the client device 120. Examples of client devices 120 include a personal computer (PC), a tablet PC, a smartphone, a wearable device, or any suitable device capable of executing instructions that specify actions to be taken by that device. The client device 120 may include a processor (e.g., a central processing unit (CPU), a graphics processing unit (GPU), a digital signal processor (DSP), one or more application specific integrated circuits (ASICs), one or more radio-frequency integrated circuits (RFICs), or any combination of these), a memory, a user interface to receive user inputs or provide outputs to the user (e.g., a visual display interface including a touch-enabled screen, a keyboard, microphone, speakers, etc.). The visual interface may include a software driver that enables displaying user interfaces on a screen (or display). A client uses the client device 120 to communicate with the computing server 110 and perform various account management related tasks such as creating transaction accounts, approving the requests to create transaction accounts, creating or modifying rules for approving the requests, or editing an existing transaction account. The user of the client device 120 may be a manager, an accounting administrator, or a general workspace member of an organization. A workspace member may be an employee of an organization.

The application 122 is a software application that operates at the client device 120. A client device 120 may be installed with various applications 122. For example, in a first application 122, the application 122 is published by the party that operates the computing server 110 to allow clients to communicate with the computing server 110. For example, the application 122 may be part of a SaaS platform of the computing server 110 that allows a client to request transaction accounts, approve the requests, or other suitable functions for managing transaction accounts. In a second application 122, the application 122 is a messaging platform application provided by bookkeeping platform server 180.

In various embodiments, an application 122 may be of different types. In one embodiment, an application 122 is a web application that runs on JavaScript and other backend algorithms. In the case of a web application, the application 122 cooperates with a web browser to render a front-end interface 124. In another embodiment, an application 122 is a mobile application. For example, the mobile application may run on Swift for iOS and other APPLE operating systems or on Java or another suitable language for ANDROID systems. In yet another embodiment, an application 122 may be a software program that operates on a desktop computer that runs on an operating system such as LINUX, MICROSOFT WINDOWS, MAC OS, or CHROME OS.

An interface 124 is a suitable interface for a client to interact with the computing server 110 or the bookkeeping platform server 180. The client may communicate to the application 122 and the servers 110 and 180 through the interface 124. The interface 124 may take different forms. In one embodiment, the interface 124 may be a web browser such as CHROME, FIREFOX, SAFARI, INTERNET EXPLORER, EDGE, etc, and the application 122 may be a web application that is run by the web browser. In one embodiment, the interface 124 is part of the application 122. For example, the interface 124 may be the front-end component of a mobile application or a desktop application. In one embodiment, the interface 124 also is a graphical user interface (GUI) which includes graphical elements and user-friendly control elements. In one embodiment, the interface 124 does not include graphical elements but communicates with the servers 110 and 180 via other suitable ways such as application program interfaces (APIs), which may include conventional APIs and other related mechanisms such as webhooks.

A transaction terminal 140 is an interface for users to make electronic fund transfers with a third party. Electronic fund transfer can be credit card payments, automated teller machine (ATM) transfers, direct deposits, debits, online transfers, peer-to-peer transactions such as VENMO, instant-messaging fund transfers such as FACEBOOK PAY and WECHAT PAY, wire transfer, electronic bill payment, automated clearing house (ACH) transfer, cryptocurrency transfer, blockchain transfer, etc. Depending on the type of electronic fund transfers, a transaction terminal 140 may take different forms. For example, if an electronic fund transfer is a credit card payment, the transaction terminal 140 can be a physical device such as a point of sale (POS) terminal (e.g., a card terminal) or can be a website for online orders. An ATM, a bank website, a peer-to-peer mobile application, and an instant messaging application can also be examples of a transaction terminal 140. The third party is a transferor or transferee of the fund transfer. For example, in a card transaction, the third party may be a merchant. In an electronic fund transfer such as a card payment for a merchant, the transaction terminal 140 may generate a transaction data that carries information related to the end user transaction device 120, the merchant, and the transaction. The transaction data is transmitted to other parties, such as credit card companies, banks, the computing server 110 for approval or denial of the transaction.

The bookkeeping platform server 180 is a server that receives transaction data for transactions associated with an organization from multiple sources and keeps a data record of the transactions performed by the organization. Examples of bookkeeping platform servers 180 include NETSUITE, SAGE, QUICKBOOKS, and other accounting platforms. In some embodiments the data records stored by the bookkeeping platform server 180 are transaction records. In some embodiments, the bookkeeping platform server 180 may be operated by an entity different from the entity operating the computing server 110. From the perspective of the computing server 110, the bookkeeping platform server 180 may be referred to as a third-party system. The bookkeeping platform server 180 may be associated with its own data structure and fields and data records stored in the bookkeeping platform server 180 may include one or more fields that may be referred to as third-party defined fields. In some embodiments, the bookkeeping platform server 180 may balance a set of nominal accounts (e.g., asset accounts, liability accounts, revenue accounts, expense accounts, or capital accounts) associated with the organization. The bookkeeping platform server 180 may use a single-entry system (where each transaction is recorded to a single nominal account) or a double-entry system (where each transaction is recorded to two nominal accounts, once as a credit to a first account and once as a debit to a second account).

Figure 3A:
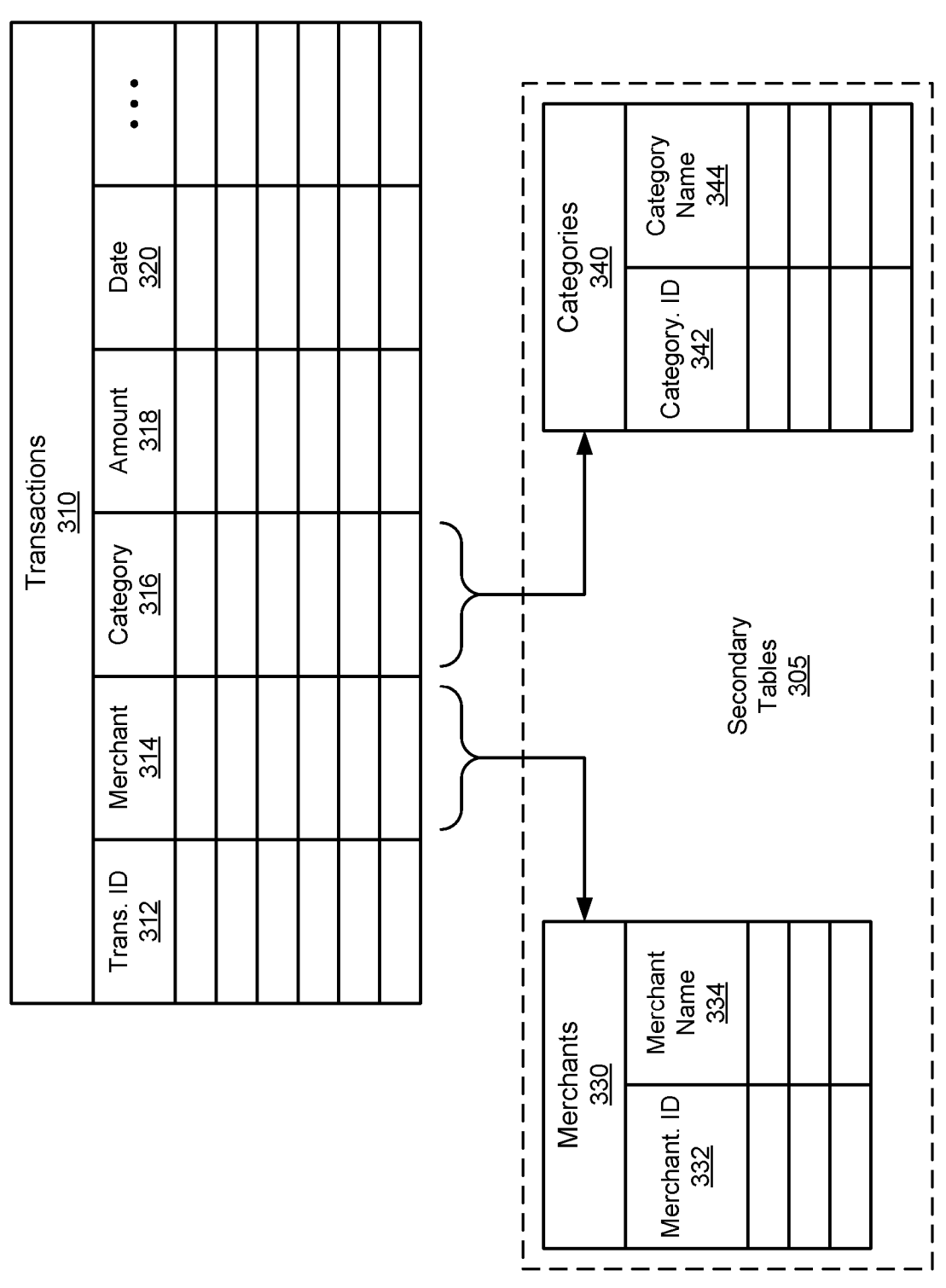
FIG. 3A illustrates the structure of a transaction table stored by the bookkeeping platform server 180, in accordance with an embodiment.

The bookkeeping platform server 180 stores the data records in the bookkeeping platform data store 185. In some embodiments, the data records stored by the bookkeeping platform server 180 are transaction records. While transaction records are used as an example of data records throughout this disclosure, various features disclosed herein may also apply to other types of data records. In some embodiments, the bookkeeping platform server 180 stores the transaction records in tables (e.g., as shown in FIG. 3A). In some embodiments, the bookkeeping platform server 180 has a predetermined schema for transaction records stored in the bookkeeping platform data store 185. That is, the bookkeeping platform server 180 may have a set of supported fields that can be used by organizations to keep records of transactions. Alternatively, the bookkeeping platform server 180 may allow organizations to create their own schema for transaction records, or may allow organizations to add custom fields to a set of basic fields supported by the bookkeeping platform server 180.

In some embodiments, the bookkeeping platform server 180 is a third-party system, separate from the computing server 110. The bookkeeping platform server 180 may have its own defined data structure and data fields. In some embodiments, the bookkeeping platform server 180 supports domain specific records. For example, the bookkeeping platform server 180 allows users to separate data records into a set of domains to allow the transactions belonging to each domain to be processed together.

The bookkeeping platform server 180 may have a graphical user interface to allow users to enter information about transactions to create new transaction records. Moreover, the bookkeeping platform server 180 may have a graphical user interface to allow users to modify or edit transaction records already stored in the bookkeeping platform data store 185. Alternatively or in addition, the bookkeeping platform server 180 may have an interface for programmatically importing transaction records. For example, the bookkeeping platform server 180 has an API to allow other systems to connect to the bookkeeping platform server 180 and instruct the bookkeeping platform server 180 to create new transaction records. Moreover, in another example, the bookkeeping platform server 180 has an interface for uploading files having a predetermined format (e.g., comma separated value files) for importing transaction records into the bookkeeping platform server 180.

Various servers in this disclosure may take different forms. In one embodiment, a server is a computer that executes code instructions to perform various processes described in this disclosure. In another embodiment, a server is a pool of computing devices that may be located at the same geographical location (e.g., a server room) or be distributed geographically (e.g., clouding computing, distributed computing, or in a virtual server network). In one embodiment, a server includes one or more virtualization instances such as a container, a virtual machine, a virtual private server, a virtual kernel, or another suitable virtualization instance.

The network 190 provides connections to the components of the system environment 100 through one or more sub-networks, which may include any combination of local area and/or wide area networks, using both wired and/or wireless communication systems. In one embodiment, a network 190 uses standard communications technologies and/or protocols. For example, a network 190 may include communication links using technologies such as Ethernet, 802.11, worldwide interoperability for microwave access (WiMAX), 3G, 4G, Long Term Evolution (LTE), 5G, code division multiple access (CDMA), digital subscriber line (DSL), etc. Examples of network protocols used for communicating via the network 190 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over a network 190 may be represented using any suitable format, such as hypertext markup language (HTML), extensible markup language (XML), JavaScript object notation (JSON), structured query language (SQL). In some embodiments, some of the communication links of a network 190 may be encrypted using any suitable technique or techniques such as secure sockets layer (SSL), transport layer security (TLS), virtual private networks (VPNs), Internet Protocol security (IPsec), etc. The network 190 also includes links and packet switching networks such as the Internet. In some embodiments, a data store belongs to part of the internal computing system of a server (e.g., the bookkeeping platform data store 185 may be part of the bookkeeping platform server 180). In such cases, the network 190 may be a local network that enables the server to communicate with the rest of the components.
Example Server Components FIG. 2 includes block diagrams illustrating components of an example computing server 110 and an example bookkeeping platform server 180, in accordance with an embodiment. The computing server 110 includes an account creation engine 205, a client profile management engine 235, an account management engine 240, an account rule management engine 245, a category identification engine 250, a named entity identification engine 255, a transaction exporting engine 270, and an interface 290. The computing server also may include different components. The functions of various components may be distributed in a different manner than described below. Moreover, while each of the components in FIG. 2 may be described in a singular form, the components may present in plurality. The components may take the form of a combination of software and hardware, such as software (e.g., program code comprised of instructions) that is stored on memory and executable by a processing system (e.g., one or more processors).

The account creation engine 205 creates new transaction accounts for users of the computing server 110. The account creation engine 205 includes the approval rules management engine 210, the request management engine 215, the request application engine 220, and the request processing engine 225.

The approval rules management engine 210 manages rules for approving an account creation request. These rules may be referred to herein as "approval rules." The rules may involve a request approver, a location, a time of day, account setting limits, IP addresses, organization titles, or any suitable parameter for characterizing the request. A request approver may be a human who reviews account creation requests (e.g., an authorized workspace member). In some embodiments, the approval rules management engine 210 maintains a list of request approvers that have the authority to review and approve or deny an account creation request. For example, the list of request approvers may be a list of workspace members within an organization's finance department. That is, account creation requests may be approved, edited, or denied by a member of the finance department. The approval rules management engine 210 may determine workspace members who are to be on the list of request approvers. For example, using an organization's hierarchical organization chart, the approval rules management engine 210 may determine that any workspace member having a title of "president" and those in the hierarchy above presidents may be request approvers.

The approval rules management engine 210 may maintain rules specifying contexts in which account creation requests are automatically approved or denied. Examples of contexts in which account creation requests may be made include a location at which the request was made (e.g., as recorded by GPS traces from the client device 120), the time of the day during which the account request was made, or an IP address with from which the request was received. In some embodiments, the approval rules management engine 210 may use account setting limits in rules to make approval requests decisions. For example, an approval rule may specify that any credit card creation request with a requested credit limit exceeding $5,000 is to be automatically denied. The approval rules management engine 210 may include rules that use organization titles. For example, an approval rule specifies that an account creation request made by a workspace member having the organizational title of "director" or higher may be automatically approved.

The approval rules management engine 210 may create or modify approval rules based on decisions made by request approvers. The approval rules management engine 210 may receive a log of account creation request decisions and determine one or more patterns in the log of decisions. Using the determined patterns, the approval rules management engine 210 may determine to create a new rule or modify an existing rule. For example, the approval rules management engine 210 determines a pattern that a request approver has overridden approval decisions made using an existing approval rule with a frequency exceeding a threshold frequency. The approval rules management engine 210 uses this pattern to modify the existing approval rule (e.g., to align more closely with other organizations' rules) or generate a recommendation to a request approver that the rule be changed. In another example, the approval rules management engine 210 determines a pattern in the account creation requests that a request approver has approved and generates a new approval rule based on a common parameter of the account creation requests (e.g., the requests were all made by the president of the organization).

The request management engine 215 manages the status of pending account creation requests and maintains a record of completed account creation requests. A status of a pending account creation request can describe the stage of the request in the approval process. For example, a status of a pending request may be "received," "assigned for review," "under review," "escalated," or "deescalated." A completed account creation request is a request that is not pending for review and may have a status of "approved," "denied," or "canceled." The request management engine 215 may track the status of a pending account creation request over time and determine, using the tracking, to generate a notification to a request approver. The request management engine 215 may generate this notification in one or more of an interface of the computing server 110. For example, the request management engine 215 determines that a request's status has been "assigned for review" longer than an average duration of requests that have this status. In response to determining the status duration is above the average duration, the request management engine 215 sends an SMS message to a request approver with a reminder to complete the review.

The request management engine 215 may determine whether a request should be prioritized and determine how the request should be communicated to a request approver for review. For example, the request management engine 215 determines that a request should be prioritized because the workspace member submitting the request holds a high job title at the organization. Upon determining the request should be prioritized, the request management engine 215 determines to assign the request to an approver with authority to review prioritized requests. Additionally, or alternatively, upon determining the request should be prioritized, the request management engine 215 determines a communication platform server that, based on past request approval logs, a request approver is most likely to review with the shortest average response time. For example, the request management engine 215 communicates with an organization's request approvers through multiple communication platform servers: email, instant messaging, and SMS. The request management engine 215 determines that approvers respond to requests to review account creation requests the fastest over instant messaging. The request management engine 215 determines to cause the communication platform server associated with the instant messaging service to display the account creation request for approval at an approver's messaging thread in the instant messaging service. The request management engine 215 may determine to send reminders at a greater frequency on one communication platform server over another based on past request approval logs showing that approvers complete the review of account creation requests faster in one communication platform server than the other.

The request management engine 215 maintains a log of completed account creation requests. The log can include, for each request, the date the request was submitted, the date the request was completed, the request approver who made a decision that caused the request to be complete, the decision made by the request approver, user-provided settings for the transaction account during the request, or any other suitable information regarding the request.

The request application engine 220 initiates a creation flow (e.g., generates an application form) for a workspace member to apply for a transaction account. In some embodiments, the request application engine 220 generates a GUI element containing input fields for entries in the creation flow (e.g., entries of an application form for a transaction account). The input fields can include an account name, an account type, a maximum number of resources that the transaction account can accrue or expend, a frequency at which the limit is reset, a date at which the transaction account may be locked or disabled, or any other suitable field for creating a transaction account with the computing server 110. The GUI element can be generated within an interface of the computing server 110 or an interface of the bookkeeping platform server 180. The request application engine 220 may receive inputs to the creation flow entries from a workspace member and provide the account creation request, including the received inputs, to the request processing engine 225, which initiates the account creation process.

Figure 6:
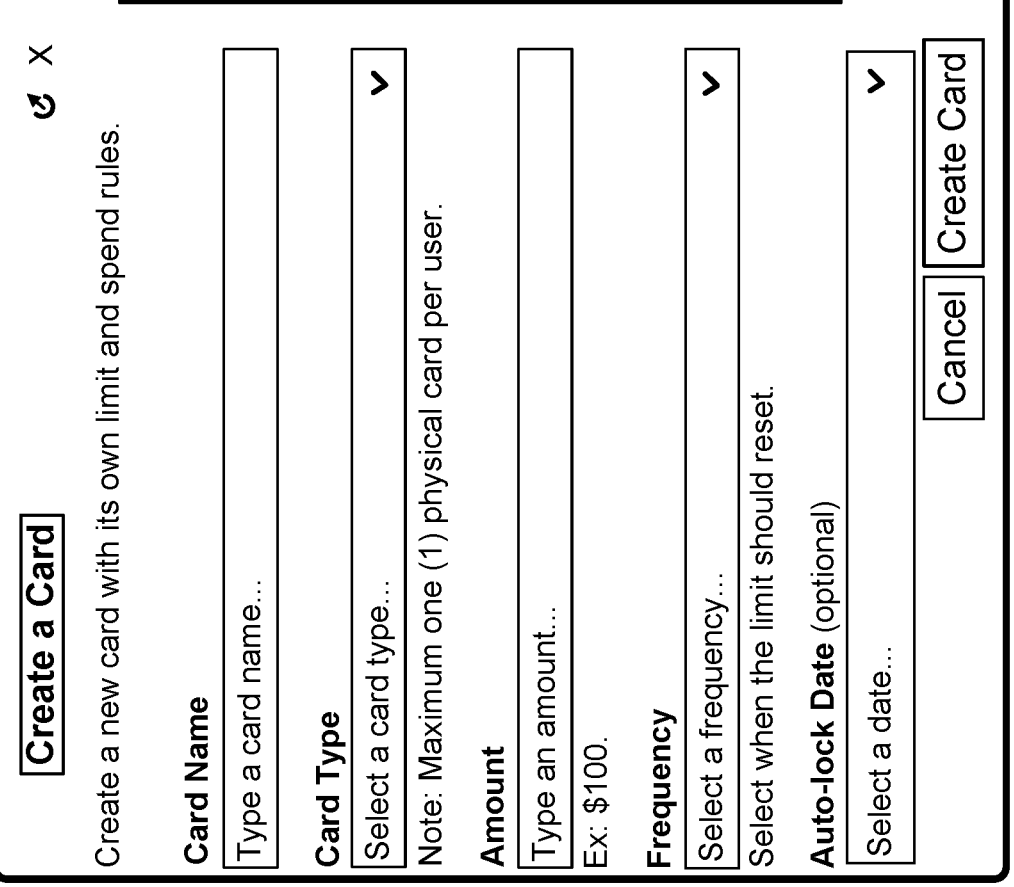
FIG. 6 illustrates an account creation request portal 600, in accordance with an embodiment.

The input fields generated by the request application engine 220 can be the same across various interfaces. For example, input fields for the same credit card creation flow entries can be generated in an interface of the computing server 110 and in an instant messaging platform server's interface. The input fields can also differ across the interfaces (e.g., distinct input fields or at least one common input field). For example, the input fields generated on the interface of the computing server 110 can include fields that allow a workspace member to specify an existing transaction account's name such that the present request can be auto-populated with settings of the existing transaction account. For an instant messaging platform's interface, the request application engine 220 may not generate such input fields to allow a user to specify an existing transaction account. An example GUI element generated using the request application engine 220 is shown in FIG. 6.

The request processing engine 225 applies approval rules to information provided by a workspace member (e.g., via entries of a creation flow) to approve or deny the transaction account creation request. The approval request may specify request approvers, where the approvers may be contacted through different servers' interfaces. In some embodiments, the request processing engine 225 may request approval from a first set of request approvers through a communication platform server (e.g., an instant messaging platform) and from a second set of request approvers through the computing server 110. In some embodiments, the request processing engine 225 first applies approval rules that do not involve a request approver, which may serve as a preliminary screening of requests to reduce the number of requests manually reviewed by request approvers. Such approval rules may deny requests based on the context of the request or inputs provided in the transaction account creation application. For example, denying transaction account creation requests with a requested transaction account limit greater than a predefined limit.

The request processing engine 225 generates the account creation requests for approval at an interface of the request approvers. The request processing engine 225 may generate a GUI element displaying one or more pending approval requests for approval. For example, the request processing engine 225 may cause a list of pending approval requests to be displayed at a messaging thread in an instant messaging platform's interface.

The request processing engine 225 may generate a GUI element that enables a request approver to modify the transaction account settings requested by the workspace member. For example, the request processing engine 225 may initiate an API call to cause a link or button to be displayed on an instant messaging platform for the approver to edit the transaction account settings. Upon selection of the link or button, the instant messaging platform may trigger a webhook to notify the computing server 110 regarding the user selection, which in turn causes the request processing engine 225 to provide editable input fields for the corresponding transaction account settings requested by the workspace member. Upon receiving the request approver's edits, the request processing engine 225 may determine that the request approver has approved the request. If there are additional request approvers that are needed to approve the account creation request, the request processing engine 225 may wait until all approvers have approved the request before the status of the request can be changed to "approved."

The request processing engine 225 may receive the request approver's edits to the transaction account settings and provide them to the workspace member who originated the account creation request for review. In response to the workspace member accepting the request approver's edits, the request processing engine 225 may initiate the creation of the transaction account. For example, if the account request is a request for a credit card account, the request processing engine 225 may contact a credit card company or bank to obtain a credit card account for the user under the settings agreed upon between the request approver and the workspace member who originated the request.

The client profile management engine 235 stores and manages named entity data and transaction data of clients of the computing server 110. The computing server 110 serves various clients (e.g., organizational clients) that have different associated named entities such as employees, vendors, and customers. For example, the client profile management engine 235 may store the employee hierarchy of a client to determine the administrative privilege of an employee in managing a transaction. An administrator of the client may specify that certain employees from the financial department and managers have the administrative privilege to create cards, adjust subscription plans, and manage vendors for the organization. The client profile management engine 235 assigns metadata tags to transaction data of an organization to categorize the transactions in various ways, such as by transaction types, by merchants, by date, by amount, by card, by employee owner identifier, by employee groups, etc. The client profile management engine 235 monitors the spending of various transactions with respect to different vendors.

The account management engine 240 creates and manages transaction accounts including payment accounts such as credit cards that are issued by the computing server 110. A transaction account is associated with a named entity such as an employee and may correspond to a card such as a credit card, a prepaid card, etc. A client may use the computing server 110 to issue domain-specific payment accounts such as company cards. The client enters account information such as the cardholder's name, role and job title of the cardholder in the client's organization, limits of the card, and transaction rules associated with the card. In response, the account management engine 240 creates the card serial number, credentials, a unique card identifier, and other information needed for the generation of a payment account and corresponding card. The account management engine 240 associates the information with the cardholder's identifier. The computing server 110 communicates with a credit card company (e.g., VISA, MASTERCARD) to associate the card account created with the identifier of the computing server 110 so that transactions related to the card will be forwarded to the computing server 110 for approval.

The account rule management engine 245 manages rules and restriction of cards and payment accounts created by the computing server 110. The cards and payment accounts may be associated with one or more transaction rules that are specified by the client's administrator or the card holder. Rules may be associated with pre-authorization and restrictions on certain transactions. Rules can be based on transaction categories, merchant categories, specific merchants, time limits, date limits, amount limits, and/or other suitable criteria, whether the criteria are permanent or temporary, dynamic or predefined, party-specific or not. For example, an administrator, who could be a designated employee or the credit card holder, in creating or editing a card, may specify a date and time limit on the card. The date and time limit can be permanent (e.g., a card being invalid after a certain time and date), periodic (e.g., a card being invalid during weekend and holidays), temporary (e.g., a card being invalid between two dates), and dynamic (e.g., a card being valid or invalid based on other triggering conditions). The administrator may also specify a transaction amount limit for each transaction. The transaction amount limit is different from the card limit. The card limit specifies the total amount that a card holder can spend for a period of time (e.g., monthly limit). The administrator may further specify a transaction amount limit for the maximum amount of spending for each transaction. In some cases, the limit of a card may also be aggregated toward a total limit of the organization. The administrator may specify various limits using a portal provided by the computing server 110. The administrator may also specify transaction category, merchant category, and specific merchants that are pre-approved or blacklisted for a specific card. The computing server 110 may impose a merchant-specific restriction on a card. For example, an administrator of a client may specify that a specific card can only be used with a specific merchant. The account management engine 240 stores various rules associated with each card as part of variables associated with the card.

The category identification engine 250 identifies whether a transaction belongs to a particular merchant category provided by the computing server 110. Example categories may include "Books and Newspapers," "Car Rental," "Clothing," "Electronics," "Entertainment," etc. An administrator may toggle each of the categories to authorize or restrict the use of a particular card. The computing server 110 receives transaction data of credit payment and determines the category to which the transaction belongs. In one embodiment, the merchant categories provided by the computing server 110 are different from the merchant category codes (MCC). In one embodiment, the computing server 110 uses a lookup table to determine whether a transaction belongs to a category provided by the computing server 110 based on MCC. For example, the MCC provides more than 200 categories while the customized categories of the computing server 110 may include a small number of categories (e.g., less than 50 categories). A lookup table is constructed to map the MCC categories to the customized categories of the computing server 110.

The named entity identification engine 255 identifies specific named entities associated with various transactions. For a given transaction of an organizational client, there can be two or more different types of named entities involved in the transaction. For example, the transaction may be associated with a third party such as a customer or a vendor. In addition, an organization employee may be the person who caused the transaction and is responsible for the transaction. In some cases, the employee may be referred to as the owner of the transaction. The named entity identification engine 255 identifies various types of named entities in the transactions of a client.

With respect to the identification of vendors that conduct businesses with the organization client, the named entity identification engine 255 may identify merchants that are associated with the transactions. The named entity identification engine 255 may apply a model to determine the merchant that is associated with a particular transaction. The model may be a machine learning model or an algorithmic model that includes a set of rules to determine the merchant. For example, the named entity identification engine 255 parses transaction data from different clients to identify patterns in the transaction data specific to certain merchants to determine whether a transaction belongs to a merchant. In a card purchase, the transaction data includes merchant identifiers (MID), merchant category code (MCC), and the merchant name. However, those items are often insufficient to identify the actual merchant of a transaction. The MID is often an identifier that does not uniquely correspond to a merchant. In some cases, the MID is used by the POS payment terminal company such that multiple real-world merchants share the same MID. In other cases, a merchant (e.g., a retail chain) is associated with many MIDs with each branch or even each registry inside a branch having its own MID. The merchant name also suffers the same defeats as the MID. The merchant name may also include different abbreviations of the actual merchant name and sometimes misspelling. The string of the merchant name may include random numbers and random strings that are not related to the actual real-world name of the merchant. The named entity identification engine 255 applies various algorithms and machine learning models to determine the actual merchant from the transaction data. The named entity identification engine 255 may search for patterns in transaction data associated with a particular merchant to determine whether a transaction belongs to the merchant. For example, a merchant may routinely insert a code in the merchant name or a store number in the merchant name. The named entity identification engine 255 identifies those patterns to parse the actual merchant name. Examples of how a merchant is identified are discussed in further detail in association with U.S. patent application Ser. No. 17/351,120, entitled real-time named entity based transaction approval, filed on Jun. 17, 2021, is incorporated by reference herein for all purposes.

The named entity identification engine 255 may also identify the employee owner with respect to a transaction as well as a vendor. The named entity identification engine 255 may use any suitable methods to identify the employee owner. For example, the named entity identification engine 255 may apply a model to determine the employee who should be responsible for a particular transaction or a particular vendor. The model may be a machine learning model or an algorithmic model that includes a set of rules to determine the employee owner. In some cases, with respect to a particular transaction, the model may include a rule determining that the employee who incurred the expense associated with the transaction or who caused the transaction is the owner. In some cases, the model may include a rule determining that the employee who uploaded the invoice or record associated with the transaction is the owner. With respect to a vendor, the named entity identification engine 255 may also assign an "owner," who is an employee that is primarily responsible for managing the transactions associated with the vendor. In some cases, the model may include a rule determining that the employee who spent the most with the vendor is the owner. In other cases, the model may include a rule determining that the employee who has the highest spending recently or within a specific time period is the owner. The model may also be a machine learning model that predicts the owner of a transaction or associated with a vendor. The owner automatically determined by the named entity identification engine 255 may also be manually adjusted by the client administrator.

The transaction exporting engine 270 exports transactions recorded by the computing server 110 to the bookkeeping platform server 180. The transaction exporting engine 270 includes a data synchronization engine 272, a transaction classification engine 274, and a transaction formatting engine 278.

The data synchronization engine 272 synchronizes the structure of data records (such as transaction records) in the bookkeeping platform server 180 and, in some embodiments, available values for a particular third-party defined field in the bookkeeping platform server 180. For example, the data synchronization engine 272 receives a schema of transaction records in the bookkeeping platform server 180. The data synchronization engine 272 may receive the name and description of each third-party defined field of a transaction record. Moreover, the data synchronization engine 272 may send a request to the bookkeeping platform server 180 to add new third-party defined fields to the schema of the transaction records. In some embodiments, the data synchronization engine 272 may also receive available values for a particular third-party defined field. For example, in a category field that classifies named entities into different categories, the bookkeeping platform server 180 may define different categories than the computing server 110. The data synchronization engine 272 retrieves the available categories from the bookkeeping platform server 180 and maintains a mapping between the categories defined in computing server 110 and the categories defined in bookkeeping platform server 180. For example, in merchant categories, the computing server 110 may maintain a set of categories based on the MCCs or other suitable classifications based on credit card transactions while the bookkeeping platform server 180 may have its own classification. The data synchronization engine 272 periodically retrieves an updated list of merchant categories used in the bookkeeping platform server 180. In some embodiments, the computing server 110 may be in communication with multiple bookkeeping platform servers 180, each of which has its own definitions of categories. The data synchronization engine 272 maintains updated data from various bookkeeping platform servers 180. In some embodiments, a bookkeeping platform server 180 may also classify data records by different domains associated with an organization. The data synchronization engine 272 retrieves the available domains defined in the bookkeeping platform server 180.

In some embodiments, one or more third-party defined fields of transaction records in the bookkeeping platform server 180 are linked to entries in a secondary table 305 in the bookkeeping platform server 180. For example, FIG. 3A illustrates the structure of a transaction table stored by the bookkeeping platform server 180. Each transaction record in the transactions table 310 includes a transaction identification field 312, a merchant field 314, a category field 316, an amount field 318, and a date field 320. The merchant field 314 is linked to a merchants table 330 and the category field 316 is linked to a categories table 340. As such, the values stored in the merchant field 314 of a transaction record stored in the transactions table 310 is selected from an entry in the merchants table 330, and the values stored in the category field 316 of a transaction record stored in the transactions table 310 is selected from an entry in the categories table 340.

For third-party defined fields of transaction records that link to secondary tables 305 in the bookkeeping platform server 180, the data synchronization engine 272 retrieves the available entries from the secondary tables 305 of the bookkeeping platform server 180. For example, for the schema shown in FIG. 3A, the data synchronization engine 272 retrieves the entries from the merchants table 330 and the entries from the categories table 340 to apply the entries in the merchants table 330 and the categories table 340 to transaction records stored by the computing server 110.

In some embodiments, the data synchronization engine 272 sends requests to the bookkeeping platform server 180 to create new records in secondary tables 305 associated with one or more third-party defined fields of transaction records in the transactions table 310 in the bookkeeping platform server 180. For example, if a transaction record in the computing server 110 is associated with a given value for a third-party defined field associated with a secondary table 305 and the secondary table 305 in the bookkeeping platform server 180 does not include the value, the data synchronization engine 272 sends a request to the bookkeeping platform server 180 to create a new entry in the secondary table 305 to store the given value.

Figure 3B:
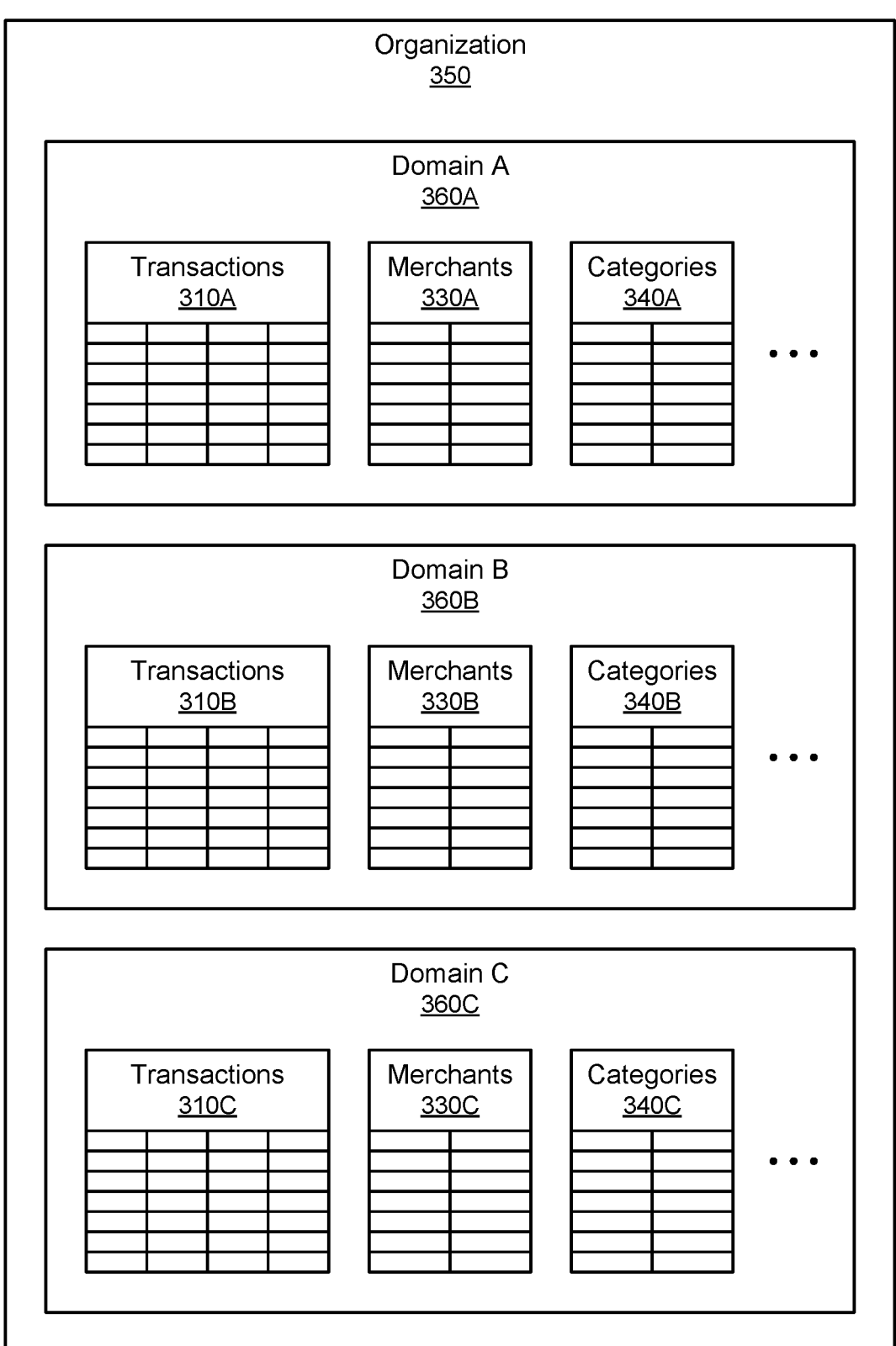
FIG. 3B illustrates an example of an organization having multiple domains, in accordance with an embodiment.

The transaction classification engine 274 analyzes transactions and determines a bookkeeping platform domain for the transaction. An organization using the computing server 110 may be associated with multiple bookkeeping platform domains in the bookkeeping platform server 180. For example, an organization may have different subsidiaries, each associated with one domain in the bookkeeping platform server 180. FIG. 3B illustrates an example of an organization 350 having multiple domains 360, in accordance with one embodiment.

Each domain 360 is associated with a set of transaction records. For example, domain A 360A stores transaction records in a transactions table 310A, domain B 360B stores transaction records in a transaction table 310B, and domain C 360C stores transaction records in a transaction table 310C. In some embodiments, the bookkeeping platform server stores all the transactions for every domain in a single collection of transaction records (e.g., in a single transactions table) and has a field to specify which domain each transaction record belongs to.

Moreover, each domain may be associated with a set of records in one or more secondary tables 305. For example, domain A 360A stores merchant entries in the merchant table 330A and category entries in the categories table 340A, domain B 360B stores merchant entries in the merchant table 330B and category entries in the categories table 340B, and domain C 360C stores merchant entries in the merchant table 330C and category entries in the categories table 340C.

For each transaction in the computing server 110, the transaction classification engine 274 identifies a corresponding bookkeeping platform domain to export the transaction with. In some embodiments, the transaction classification engine 274 determines a bookkeeping platform domain based on the transaction account used for completing the transaction. For example, when creating a new transaction account, a user creating the new transaction account specifies, in the account creation request, a bookkeeping platform domain to associate the new transaction account with.

In some embodiments, the transaction classification engine 274 applies a trained model to identify a bookkeeping platform domain to associate a transaction with. The trained model may be trained using past transactions that have been exported to the bookkeeping platform server 180. The trained model may take into consideration a transaction account used for completing the transaction, the named entities associated with the transaction (e.g., a merchant associated with the transaction), a category of the transaction, etc.

Moreover, upon completing a transaction by the computing server 110, the transaction classification engine 274 may send a message to the owner of the transaction to provide the bookkeeping platform domain to associate the transaction with, or may send a message to verify whether an identified bookkeeping platform domain identified by the transaction classification engine 274 (e.g., by using a trained model) is correct. In some embodiments, the transaction classification engine 274 may allow users (such as the owner of the transaction or an account administrator) to modify the classification associated with the transaction prior to exporting the transaction to the bookkeeping platform server 180.

The transaction record auto-population engine 276 identifies values for one or more fields of a transaction record. The transaction record auto-population engine 276 may identify values for one or more fields that are specific to the computing server 110. Moreover, the transaction record auto-population engine 276 may identify values for one or more third-party defined fields that are specific to the bookkeeping platform server 180. That is, for each transaction record stored in the computing server 110 that is to be exported to the bookkeeping platform server 180, the transaction record auto-population engine 276 determines values for fields that correspond to third-party defined fields of transaction records stored by the bookkeeping platform server 180.

In some embodiments, the values identified by the transaction record auto-population engine 276 are domain specific. That is, for a given transaction record, the values available to be applied to a transaction record may be based on the bookkeeping platform domain associated with the transaction.

The transaction formatting engine 278 creates payloads for exporting transaction records to the bookkeeping platform server 180. In some embodiments, the transaction formatting engine 278 formats transaction records to be exported to the bookkeeping platform server 180. In some embodiments, the payload is generated as a file storing the information for exporting one or more transaction records. For example, upon receiving a request to synchronize one or more transactions with the bookkeeping platform server 180, the transaction formatting engine 278 generates a file (e.g., a comma separated values (CSV) file) using a format corresponding to the bookkeeping platform server 180 to transfer the information associated with each transaction record to the bookkeeping platform server 180. Alternatively, in other embodiments, the payload created by the transaction formatting engine 278 is a payload of an API call of an API defined by the bookkeeping platform server 180. For example, upon receiving a request to synchronize one or more transactions with the bookkeeping platform server 180, the transaction formatting engine 278 generates a new request (e.g., using an API of the bookkeeping platform server 180) to transfer the information associated with each transaction record to the bookkeeping platform server 180.

The interface 290 enables the computing server 110 to communicate with different parties and servers. For example, the interface 290 enables the computing server 110 to process data received from the client device 120 (e.g., over the network 190). The interface 290 may take the form of a SaaS platform that provides clients with access to various functionalities provided by the computing server 110. The interface 290 provides a portal in the form of a GUI for clients to create and manage credit card accounts, manage transactions, and synchronize transactions with the bookkeeping platform server 180. Example of a GUI element of the interface 290 is shown in FIGS. 6-10. The interface 290 is in communication with the application 122 and provides data to render an account creation request portal in the application 122.

In one embodiment, the interface 260 also includes an API for clients of the computing server 110 to communicate with the computing server 110 through machines. The API allows the clients to retrieve the computing server 110 stored in the data store 115, send query requests, and make settings through a programming language. Various settings and functionalities of the various engines of the computing server 110 may be changed by the clients through sending commands to the API. The API allows the clients to automate various processes such as vendor management and transaction management.

Synchronization of Transaction Records

Figure 4:
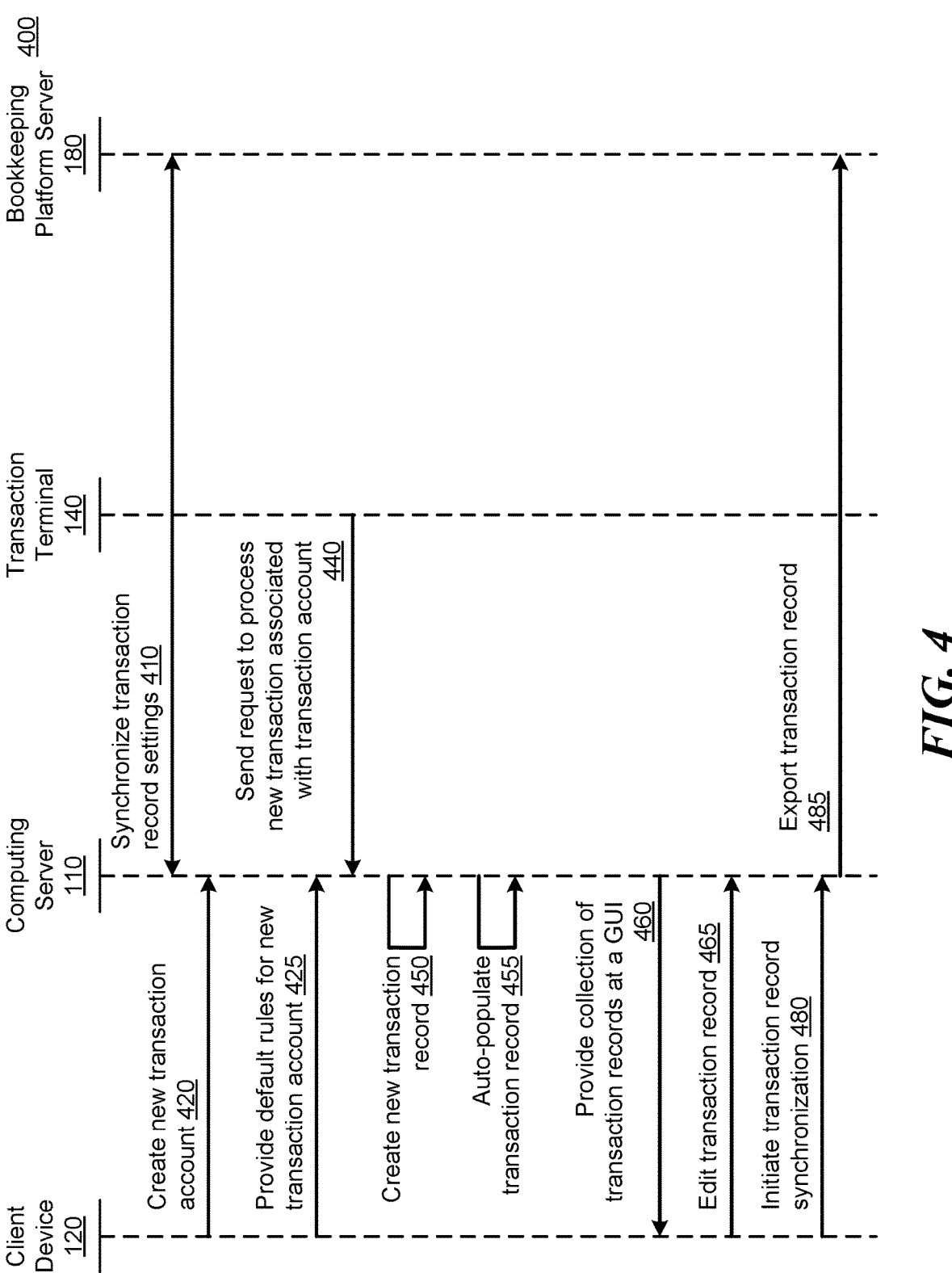
FIG. 4 is an interaction diagram depicting a computer-implemented process for synchronizing transaction records between a computing server and a bookkeeping platform server, in accordance with an embodiment.

FIG. 4 is an interaction diagram depicting a computer-implemented process 400 for synchronizing transaction records between a computing server 110 and a bookkeeping platform server 180, in accordance with an embodiment. For the particular embodiment discussed in FIG. 4, the computing server 110 and the bookkeeping platform server 180 are different servers and operate independently. As referred to herein, "independently operating" may describe servers whose individual operations and resources are not dependent upon the operations and resources of others (e.g., no shared processing, memory, or power resources). For example, the computing server 110 includes one or more computers. A computer associated with the computing server 110 includes a first processor and first memory. The first memory stores a set of code instructions that, when executed by the first processor, causes the first processor to perform some of the steps described in the process 400. The bookkeeping platform server 180 uses different hardware and includes a different computer (or one or more computers) that includes a second processor and second memory. The bookkeeping platform server 180 is an instant messaging platform in the process 400. The set of code instructions also include instructions that, when executed by the first processor, cause the second processor to perform steps. While two independent servers are described as an example architecture associated with the process 400, in some embodiments a single server can also perform the entire process 400.

The computing server 110 synchronizes 410 transaction record settings from the bookkeeping platform server 180. In some embodiments, the data synchronization engine 272 receives information about a schema of transaction records stored by the bookkeeping platform server 180. For example, the data synchronization engine 272 may receive a list of third-party defined fields included in each transaction record stored by the bookkeeping platform server 180. In some embodiments, for each third-party defined field of a transaction record stored by the bookkeeping platform server 180, the data synchronization engine 272 receives a name of the field, an indication of whether the field is required (e.g., whether the field can be left blank), a type of data stored in the field, etc. In some embodiments, the schema for a transaction record may be domain dependent. That is, the data synchronization engine 272 may receive a schema for transaction records for each domain of a set of domains (e.g., for each domain associated with an organization).

Moreover, the data synchronization engine 272 receives entries in secondary tables 305. For each third-party defined field of a transaction record stored by the bookkeeping platform server 180 that is linked to a secondary table 305, the data synchronization engine 272 retrieves the values that can be assigned to the third-party defined field. In some embodiments, the data synchronization engine 272 sends a request to the bookkeeping platform server 180 to retrieve the entries stored in each secondary table 305 and stores the entries locally in the data store 115.

In some embodiments, the data synchronization engine 272 sends a request to the bookkeeping platform server 180 to create new entries in one or more secondary tables 305. For example, the computing server 110 may determine whether one or more values for a given third-party defined field are available in the bookkeeping platform server 180. If the one or more values for the given third-party defined field are not available, the data synchronization engine 272 sends a request to the bookkeeping platform server 180 to create entries in one or more secondary tables 305 to enable the use of the one or more values for the given third-party defined field.

A workspace member of an organization sends 420 an account creation request to the computing server 110 to create a new transaction account associated with the organization. Moreover, the workspace member of the organization provides 425 default rules for the new transaction account. In some embodiments, the default rules for the new transaction account are provided to the computing server 110 with the account creation request. Alternatively, the default rules for the new transaction account are provided at a later time after the new transaction account has been created. In some embodiments, the rules provided by the workspace member and received by the computing server 110 are parameter-assigning rules for automatically assigning at least one data parameter to records associated with the transaction account.

An owner of the transaction account uses the transaction account at a transaction terminal 140 to complete a transaction, and the transaction terminal 140 sends 440 a request to the computing server 110 to process a new transaction associated with the transaction account. The computing server 110 receives the request and processes the new transaction. At least based on a set of rules set for the transaction account, the computing server approves or declines the transaction request received from the transaction terminal 140. In some embodiments, the computing server 110 sends an indication to the transaction terminal 140 whether the transaction has been approved or declined.

If the transaction request is approved, the computing server 110 creates 450 records of the transaction in the data store 115. In some embodiments, the computing server 110 creates a new transaction record and stores the new transaction record in the data store 115. In some embodiments, the transaction record includes information or metadata related to the transaction. For example, the transaction record includes a transaction date, a transaction amount, an identification of the entity that sent the transaction request, etc.

In some embodiments, the computing server 110 determines whether the transaction record will be exported to a bookkeeping platform server 180. For example, the computing server 110 determines whether the organization is associated with an account in the bookkeeping platform server 180. If the computing server 110 determines that the transaction record will be exported to the bookkeeping platform server 180, the computing server 110 identifies a schema for transaction records stored by the bookkeeping platform server 180.

Once the computing server 110 has identified the schema for transaction records in the bookkeeping platform server 180, the computing server auto-populates or pre-fills the third-party defined fields corresponding to transaction records in the bookkeeping platform server 180. For example, for each third-party defined field of a transaction record stored by the bookkeeping platform server 180, the computing server 110 determines a value for the bookkeeping platform server 180 to store. In some embodiments, the auto-populated value for a given third-party defined field is selected from a list of available values retrieved from the bookkeeping platform server 180 for the given field. Moreover, in some embodiments, one or more of the values assigned to one or more of the third-party defined fields are selected based on the parameter-assigning rules received by the computing server 110.

The computing server 110 provides 460 a GUI to the client device 120 presenting a collection of transaction records to a user of the client device 120. The transaction records included in the GUI present to the user the auto-populated or pre-filled values for the third-party defined fields. The GUI may allow the user of the client device 120 to select one or more transaction records to edit. For example, the GUI allows the user to select multiple transaction records to and modify all of the selected transaction records in bulk. After selecting the one or more transaction records, the user can select or provide a new value for a field to edit 465 the selected one or more data records. The computing server 110 receives the new value for the field and applies the new value to every transaction record that was selected by the user.

In some embodiments, the computing server 110 allows users to edit 465 transaction records prior to the transaction records being exported to the bookkeeping platform server 180.

The computing server 110 receives a request from a client device 120 to initiate 480 the export of one or more transaction records. For example, the computing server 110 may provide a graphical user interface for users to select one or more transaction records to be exported to the bookkeeping platform server 180. Upon receiving the request to export the one or more transaction records, the computing server 110 may determine whether the one or more transaction records are ready to be exported (e.g., whether all the required fields have been provided).

If the computing server 110 determines that the one or more transaction records are ready to be exported, the computing server 110 exports 485 the one or more transaction records to the bookkeeping platform server 180 by sending a request to the bookkeeping platform server 180 to create new transaction records corresponding to the transaction records stored by the computing server 110. To export the one or more transaction records, the computing server 110 creates a payload corresponding to the one or more transaction records. In some embodiments, the computing server 110 creates a file for transferring the information corresponding to the one or more transaction records to be exported to the bookkeeping platform server 180. The computing server 110 then sends the file to the bookkeeping platform server 180 with a request to create new transaction records to store the information included in the file. Alternatively, the computing server 110 uses an API to send the information corresponding to each transaction record and requests the bookkeeping platform server 180 to create new transaction records according to the information included with the API call.

FIG. 5 illustrates a flow diagram of a process depicting a computer-implemented process 500 for synchronizing data records (such as transaction records) between a computing server 110 and a third-party system (such as a bookkeeping platform server 180), in accordance with an embodiment.

The computing server 110 receives 510 a request to process an instance associated with a unique identifier. For example, the computing server 110 receives 510 a request to complete a transaction using a transaction account associated with an organization. The request may be received from a transaction terminal 140. The transaction request includes an identification of the transaction account (e.g., a serial number of the transaction account such as a credit card number) being used to complete the transaction. Moreover, the transaction request includes a set of parameters (e.g., an amount, an identification of a merchant sending the transaction request, etc.) associated with the transaction.

Upon processing the instance, the computing server 110 records the occurrence of the instance associated with the unique identifier. For example, upon approving the transaction, the computing server 110 creates 520 a new transaction record. The transaction record stores the parameters associated with the transaction. In some embodiments, the computing server 110 creates the new transaction record according to a transaction record schema corresponding to the computing server 110. In some embodiments, the computing server 110 uses the named entity identification engine 255 and the category identification engine 250 to identify values for various fields of a transaction record.

If the organization uses a bookkeeping platform server 180 and the organization exports transaction records from the computing server 110 to the bookkeeping platform server 180 (e.g., the organization has connected the organization's account in the computing server 110 to the organization's account in the bookkeeping platform server 180), the transaction classification engine 274 of the computing server 110 identifies 530 a domain for the occurrence of the instance. The domain may be identified based on one or more parameters associated with the instance, or based on the unique identifier associated with the instance. The domain may also be identified based on a domain-assigning rule associated with the unique identifier associated with the instance.

For example, the computing server 110 identifies 530 a domain for the transaction. In some embodiments, the domain is determined based on the transaction account that was used to complete the transaction. For example, the organization may set us a set of rules for associating transactions completed with specific transaction accounts to corresponding domains in the bookkeeping platform server 180. Alternatively, the domain is determined based on parameters of the transaction. For example, the organization may set up a set of rules for associating transactions having specific parameters (e.g., specific merchants or specific categories) to corresponding domains in the bookkeeping platform server 180.

The computing server 110 auto-populates the data record corresponding to the occurred instance. In some embodiments, the computing server 110 auto-populates the data record based on parameter-assigning rules associated with the unique identifier associated with the instance. For example, the transaction record auto-population engine 276 of the computing server 110 identifies 540 values for a first set of fields of a transaction record in the bookkeeping platform server 180. For the new transaction record created by the computing server 110, the transaction record auto-population engine 276 of the computing server 110 identifies a set of fields for a corresponding transaction record in the bookkeeping platform server 180. The transaction record auto-population engine 276 of the computing server 110 then identifies values for one or more of the fields for the corresponding transaction record in the bookkeeping platform server 180. In some embodiments, values for one or more fields are determined at least based on the identified domain associated with the transaction record. Moreover, in some embodiments, values for one or more fields of the corresponding transaction record in the bookkeeping platform server 180 are determined based on rules associated with the transaction account used for completing the transaction. In some embodiments, values for one or more fields of the corresponding transaction record in the bookkeeping platform server 180 are determined based on one or more parameters of the transaction.

The computing server 110 causes a client device 120 to display at a GUI, a collection of data records that are associated with different unique identifiers. The collection of data records displayed in the GUI includes the unique identifier associated with the instance. Moreover, the collection of data records displayed in the GUI include a set of third-party defined fields that are defined by a third-party system such as the bookkeeping platform server 180.

In some embodiments, the computing server 110 receives 550 values for a second set of fields of the transaction record in the bookkeeping platform server 180. The values for the second set of fields of the transaction record in the bookkeeping platform server 180 are provided to the computing server 110 by a user through a client device 120. The first set of fields for which values are automatically identified by the computing server 110 may overlap with the second set of fields for which values are received from one or more users of the computing server 110.

In some embodiments, for one or more fields of the second set of fields, the computing server 110 sends a message to one or more users to provide the values for the one or more fields of the second set of fields for the corresponding transaction record in the bookkeeping platform server 180. For example, upon completing a transaction, the computing server 110 sends a message to the owner of the transaction (i.e., a user assigned to the transaction account used for completing the transaction) to provide values for one or more fields (e.g., a memo field or a receipt field). The one or more fields for which values are requested to the user may be selected based on a set of rules preset before the transaction took place. For example, an administrator of the organization may set rules for requiring users to provide a memo or a picture of a receipt if certain conditions are met (e.g., if the transaction amount is greater than a set threshold value). The computing server 110 identifies the one or more fields and generates an interface for informing the user to provide values for the one or more fields and for allowing the user to provide the values for the one or more fields.

In other embodiments, the computing server 110 provides a user interface for allowing users to edit the values automatically identified by the computing server for fields in the first set of fields. For example, the computing server 110 may provide a dashboard displaying a list of transaction records. The dashboard may also display the values identified for the first set of fields for the corresponding transaction record in the bookkeeping platform server 180. The dashboard may allow the user to edit the values if the user determines that the values that were identified by the computing server 110 were incorrect or inaccurate.

In some embodiments, the computing server 110 allows users to change the domain associated with the transaction record. For example, the dashboard of the computing server 110 may provide an indication of the domain that was automatically identified for the transaction record. The dashboard may also allow the user to select a different domain for the transaction record if the user determines that the domain that was automatically identified was incorrect. In some embodiments, if a user changes the domain associated with the transaction, the transaction record auto-population engine 276 of the computing server 110 determines a new set of values for the first set of fields for the corresponding transaction record in the bookkeeping platform server 180 based on the user selected domain. For example, the new user selected domain may have a different set of rules for setting the values of each of the fields. Alternatively, the user selected domain may not support one or more of the values that were previously identified for the transaction record assuming the transaction record was associated with the domain that was identified by the transaction classification engine 274 of the computing server 110.

The computing server 110 exports 570 the data record to the third-party system such as the bookkeeping platform server 180. The computing server 110 may initiate the export of data records in response to receiving a request from a client device 120. The request may identify one or more data records to be exported to the bookkeeping platform server 180, or may request all transactions that have not yet been exported to be exported in bulk. In some embodiments, the computing server 110 creates a payload corresponding to the one or more data records.

In some embodiments, to export one or more transaction records, the transaction formatting engine 278 of the transaction exporting engine 270 creates a new export file based on a format corresponding to the bookkeeping platform server 180. The file may include a row for each transaction to be exported and a column for each field of corresponding transaction records in the bookkeeping platform server 180. The computing server 110 sends the export file along with a request to create new transaction records in the bookkeeping platform server 180 according to the information included in the export file. Upon receiving the export file, the bookkeeping platform server 180 creates new transaction records for each of the transactions included in the export file according to the values stored in the export file, and stores the new transaction records in the bookkeeping platform data store 185. In some embodiments, the bookkeeping platform server 180 sends a confirmation message to the computing server 110 indicating whether each of the transaction records were successfully created.

Alternatively, to export one or more transaction records, the transaction formatting engine 278 of transaction exporting engine 270 creates one or more new API calls for requesting the bookkeeping platform server to create new transaction records. For example, the transaction formatting engine 278 of transaction exporting engine 270 creates a new API call for each transaction to be exported to the bookkeeping platform server 180. In each of the API calls, the transaction formatting engine 278 of transaction exporting engine 270 includes the identified values for the fields in the first set of fields and the values received from users for the fields in the second set of fields.

In some embodiments, to export a transaction record, the computing server 110 determines the domain the transaction record is associated with and identifies a nominal account in the bookkeeping platform server 180 corresponding to the domain. The computing server 110 then sends a request to the bookkeeping platform server 180 to create a new transaction record for the identified nominal account.

Example User Interfaces

FIG. 6 illustrates an account creation request portal 600, in accordance with an embodiment. In the example depicted, a workspace member requests a new credit card for expenses made by a transaction account owner (e.g., an employee of the organization). The account creation request portal includes a set of fields specifying the account settings for the credit card. Specifically, the set of fields include a card name, card type, amount, frequency, and auto-lock date. The computing server 110 may cause a client device 120 to display the account creation request portal with the set of fields. Additionally, the computing server 110 may cause an interface (e.g., a website) maintained at the computing server 110 to display a GUI with a form having the same or a similar set of fields.

FIG. 7 illustrates an account creation management interface 700, in accordance with an embodiment. Following the context of the example described in FIG. 6, FIG. 7 shows the workspace member's account creation request displayed at a webpage that the computing server 110 can cause to be generated on a web browser. The account creation request is shown in an account creation request log 710 as an entry 711 alongside requests submitted earlier, such as an entry 712 submitted by another workspace member. The data within the account creation request log 710 shown in the account creation management interface 700 may be maintained by the request management engine 215 of the computing server 110. The computing server generates the log to be interactive through filtering and search features that increase the accessibility of the requests. For example, the computing server 110 may provide a column in the log for the status of the request, and approvers can filter the requests to only show prioritized credit card creation requests.

Figure 8:
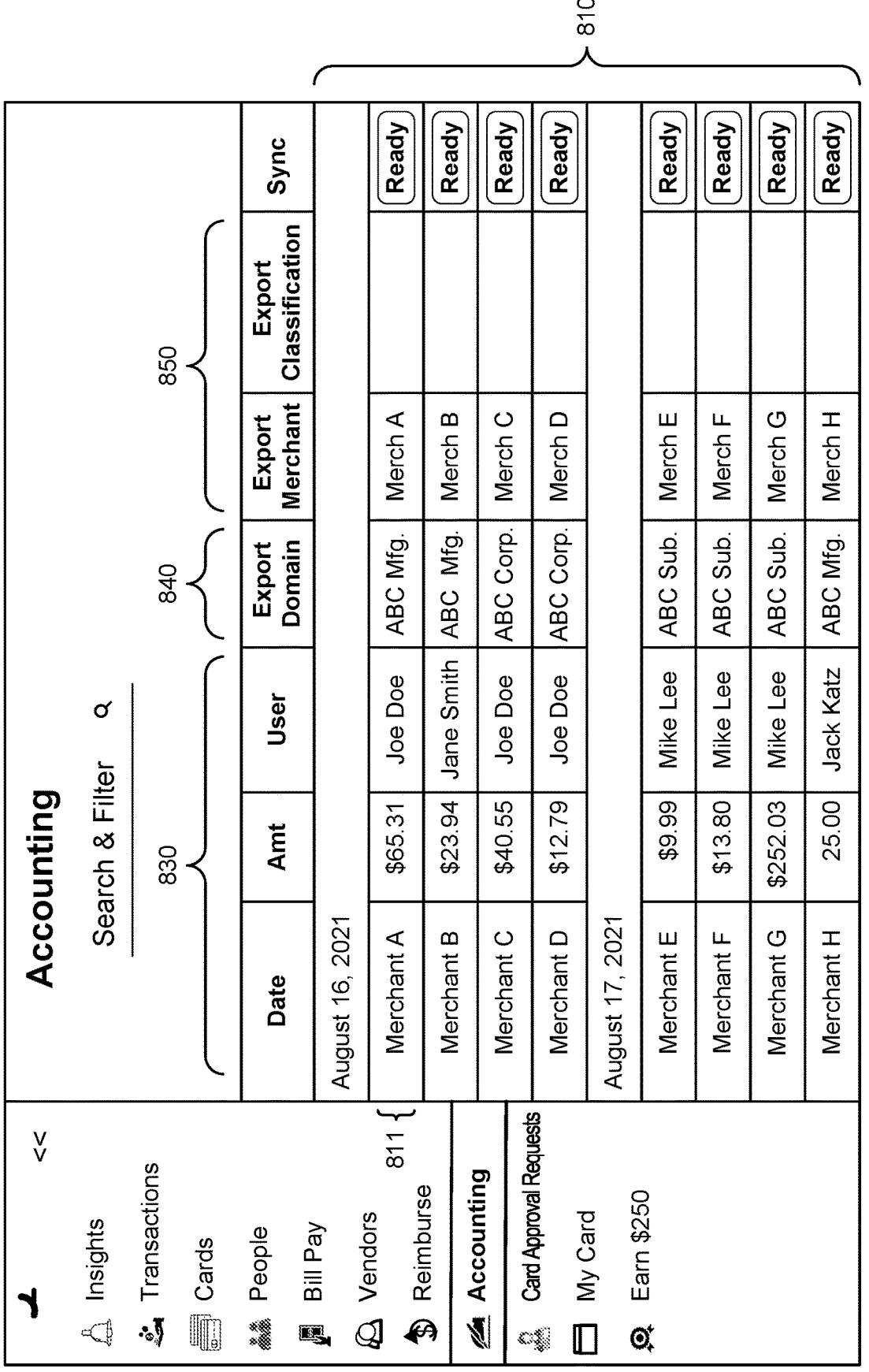
FIG. 8 illustrates an accounting dashboard 800, in accordance with an embodiment.

FIG. 8 illustrates an accounting dashboard 800, in accordance with an embodiment. Following the context of the example described in FIGS. 6-7, FIG. 8 shows an accounting dashboard 800 displayed at a webpage that the computing server 110 can cause to be generated on a web browser. The accounting dashboard shows a transaction log 810 including a list of transaction records 811 corresponding to transactions processed by the computing server 110 for the organization. For example, one or more of the transaction records 811 correspond to transactions completed using a transaction account created using the account creation request portal 600 of FIG. 6.

Each transaction record 811 stores a set of transaction parameters 830, an export domain 840, and a set of export fields 850 corresponding to fields of transaction records in the bookkeeping platform server 180. In the example of FIG. 8, the transaction parameters include a date, a merchant, an amount, and an owner of the transaction. The date corresponds to the day the transaction corresponding to the transaction record 811 was performed. The merchant and the owner correspond to the two entities that performed the transaction. In some embodiments, the merchant is determined based on an identification provided with a transaction request associated with the transaction record that was sent from a transaction terminal 140 to the computing server 110. Moreover, in some embodiments, the owner is determined based on the transaction account (e.g., corporate credit card) used for performing the transaction. In some embodiments, each transaction record includes additional parameters than the ones shown in FIG. 8.

The export domain 840 corresponds to the domain in the bookkeeping platform server 180 the transaction record will be exported to. In some embodiments, the export domain is determined by the transaction classification engine 274 of the transaction exporting engine 270 based on the transaction account used for performing the transaction associated with the transaction record. For example, each transaction account is associated with a default domain. Each time the transaction account is used for performing a transaction, the transaction record for the transaction performed using the transaction account is associated with the transaction account's default domain. Alternatively, the default domain may be determined based on one or more transaction parameters 830. For example, the computing server 110 determines the export domain by applying a trained model to one or more transaction parameters 830. In another example, the computing server 110 determines the export domain by applying a set of rules based on one or more transaction parameters.

In the example of FIG. 8, the set of export fields 850 includes an export merchant, and an export classification. In some embodiments, one or more export fields of the set of export fields 850 are automatically determined by the transaction record auto-population engine 276 based at least in part on one or more transaction parameters. For example, the export merchant field may be automatically determined by the transaction record auto-population engine 276 based at least in part on the merchant parameter of the transaction record. In some embodiments, the transaction record auto-population engine 276 selects the value for a given export field from a list of available values for the given export field. For example, for a given field for transaction records kept by the bookkeeping platform server 180, the bookkeeping platform server 180 may allow workspace members to select values from a preset list of values (e.g., values stored in a secondary table 305 linked to the given field). In some embodiments, if the transaction record auto-population engine 276 does not find an appropriate value to assign to an export field in the list of available values supported by the bookkeeping platform server 180, the transaction record auto-population engine 276 may instruct the data synchronization engine 272 to send a request to the bookkeeping platform server 180 to add a new value to the list of supported values for the field.

In some embodiments, values for one or more export fields are provided or can be manually edited by a workspace member reviewing the accounting dashboard 800. For export fields that are provided by workspace members, the transaction record auto-population engine 276 may not identify values to auto-populate the export field with. In such cases, the accounting dashboard may leave the user interface element corresponding to the export field for the transaction record blank. Moreover, in some embodiments, the accounting dashboard 800 allows workspace members to edit the export field values of transaction records before the transaction records have been exported to the bookkeeping platform server 180. For example, the accounting dashboard 800 may allow workspace members to type values for certain export fields (e.g., through a textbox), or to selected values from a list of available values for the export field (e.g., through a dropdown list).

In some embodiments, the accounting dashboard 800 allows a workspace member to edit multiple transaction records at the same time (e.g., in bulk). The accounting dashboard 800 may allow workplace members to select multiple transaction records, and to provide values for one or more export fields. The computing server 110 applies the received values for the one or more export fields to each of the selected transaction records. In some embodiments, the accounting dashboard 800 allows users to filter the transaction records displayed in the accounting dashboard 800. A workplace member may provide a filter parameter to cause the accounting dashboard 800 to filter the transaction records based on the provided filter parameter. The accounting dashboard 800 additionally allows the workplace member to edit all of the transaction records remaining after the filtering process. In some embodiments, the accounting dashboard 800 allows a workplace member to edit every transaction record without providing a filtering parameter.

In some embodiments, the export field values are domain dependent. For example, the values that are automatically determined by the transaction record auto-population engine 276 for one or more export fields are also based on the export domain associated with the transaction record 811. In some embodiments, the accounting dashboard 800 allows workspace members to change the export domain associated with transaction records 811. When a workspace member changes the export domain of a transaction, the transaction record auto-population engine 276 may re-analyze the transaction to identify new values for the export fields for the transaction record based rules or trained models associated with the new export domain. Alternatively, the computing server 110 may analyze the values of one or more export fields to determine if the values that were previously assigned to the export fields are also available for the new domain. In some embodiments, if one or more values for one or more export fields are not available for the new domain, the computing server 110 may delete the value from the export field, or may identify a new value for the export field.

The accounting dashboard 800 of FIG. 8 additionally provides a user interface element (e.g., a button) to flag one or more transactions as ready to be synchronized with (or exported to) the bookkeeping platform server 180. Moreover, the accounting dashboard 800 of FIG. 8 provides a button for synchronizing the transaction records flagged as ready. When a workspace member reviewing the accounting dashboard 800 activates the synchronization button, the computing server 110 initiates the process for exporting the transaction records that were flagged as ready. For example, the transaction formatting engine 278 of the transaction exporting engine 270 generates a file for exporting the transaction records to the bookkeeping platform server 180, or may generate API calls for exporting the transaction records to the bookkeeping platform server 180.

The computing server 110 sends a request to the bookkeeping platform server 180 to create new transaction records to store the transaction records being exported from the computing server 110. Specifically, for each transaction record being exported, the computing server 110 sends a request to bookkeeping platform server 180 to create a corresponding transaction record in a nominal account associated with the domain of the transaction record. In some embodiments, the computing server 110 identifies a nominal account in the bookkeeping platform server 180 based on the domain associated with a transaction record, and sends a request to the bookkeeping platform server 180 to create a new transaction record for the identified nominal account.

In some embodiments, the request to create a new transaction record in the bookkeeping platform server 180 includes the export parameters associated with the transaction record. Moreover, the request to create the new transaction record in the bookkeeping platform server 180 includes one or more transaction parameters (e.g., an amount parameter) associated with the transaction record.

In some embodiments, the bookkeeping platform server 180 sends a confirmation message to the computing server 110 when a new transaction record has been successfully created based on an exported transaction record. Upon receiving the confirmation message, the computing server 110 may remove the transaction record from the transaction log 810. As such, the transaction log 810 may only include transaction records that have not yet been exported from the computing server 110 to the bookkeeping platform server 180.

FIG. 9 illustrates a transaction account rules management interface 900, in accordance with an embodiment. Following the context of the example described in FIG. 6-8, FIG. 9 shows a transaction account rules management interface 900 displayed at a webpage that the computing server 110 can cause to be generated on a web browser. The transaction account rules management interface 900 allows workspace members to create or modify transaction account specific rules (such as parameter-assigning rules) for auto-populating or pre-filling transaction records corresponding to transactions processed by the computing server 110 for the organization. That is, rules for auto-populating or pre-filling transaction records for transactions performed using a specific transaction account. The transaction account rules management interface 900 includes a user interface element 910 for specifying a default export domain 940 for transactions completed with a corresponding transaction account. Each time a new transaction is performed using the transaction account, the computing server 110 creates a new transaction record and associates the transaction record with the selected default export domain 840. Moreover, the transaction account rules management interface 900 includes user interface elements 920 for specifying default values for one or more export fields 850. Each time a new transaction is performed using the transaction account, the computing server 110 creates a new transaction record and auto-populates or pre-fills the transaction record with the selected default values for the one or more export fields.

FIG. 10 illustrates a transaction record configuration interface 1000, in accordance with an embodiment. Following the context of the example described in FIG. 6-9, FIG. 10 shows a transaction record configuration interface 1000 displayed at a webpage that the computing server 110 can cause to be generated on a web browser. The transaction record configuration interface 1000 allows workspace members to specify one or more configuration properties for one or more transaction parameters, an export domain, or one or more export fields of transaction records created by the computing server 110. For each transaction parameter or export field, the transaction record configuration interface 1000 allows workspace members to specify whether the parameter or field is a required parameter or field. If the parameter or field is required, upon successful completion of a transaction, the computing server 110 may send a message to one or more users (such as the owner of the transaction or an administrator) to provide values for the required parameters or fields. In the example shown in FIG. 10, each transaction record requires a receipt if the transaction is for an amount above $100 and requires a memo if the transaction is for an amount above $50. If the owner of a transaction account performs a transaction that is above $50, the computing server 110 may send a message to the owner of the transaction account to provide a memo for the transaction. Similarly, if the owner of a transaction account performs a transaction that is above $100, the computing server 110 may send a message to the owner of the transaction account to provide a memo and a receipt for the transaction.

In some embodiments, the computing server 110 sends messages to one or more users to provide values for required parameters or fields for parameters or fields that the computing server 110 is not able to automatically determine (e.g., by applying a set or rules or a trained model). Moreover, the computing server 110 may send period reminders to the one or more users until the one or more users provide the values for the requested parameters or fields.

Additional Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Embodiments according to the invention are in particular disclosed in the attached claims directed to a method and a computer program product, wherein any feature mentioned in one claim category, e.g., method, can be claimed in another claim category, e.g., computer program product, system, storage medium, as well. The dependencies or references back in the attached claims are chosen for formal reasons only. However, any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject-matter which can be claimed comprises not only the combinations of features as set out in the disclosed embodiments but also any other combination of features from different embodiments. Various features mentioned in the different embodiments can be combined with explicit mentioning of such combination or arrangement in an example embodiment. Furthermore, any of the embodiments and features described or depicted herein can be claimed in a separate claim and/or in any combination with any embodiment or feature described or depicted herein or with any of the features.

Some portions of this description describe the embodiments in terms of algorithms and symbolic representations of operations on information. These operations and algorithmic descriptions, while described functionally, computationally, or logically, are understood to be implemented by computer programs or equivalent electrical circuits, microcode, or the like. Furthermore, it has also proven convenient at times, to refer to these arrangements of operations as engines, without loss of generality. The described operations and their associated engines may be embodied in software, firmware, hardware, or any combinations thereof.

Any of the steps, operations, or processes described herein may be performed or implemented with one or more hardware or software engines, alone or in combination with other devices. In one embodiment, a software engine is implemented with a computer program product comprising a computer-readable medium containing computer program code, which can be executed by a computer processor for performing any or all of the steps, operations, or processes described. The term "steps" does not mandate or imply a particular order. For example, while this disclosure may describe a process that includes multiple steps sequentially with arrows present in a flowchart, the steps in the process do not need to be performed by the specific order claimed or described in the disclosure. Some steps may be performed before others even though the other steps are claimed or described first in this disclosure.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. In addition, the term "each" used in the specification and claims does not imply that every or all elements in a group need to fit the description associated with the term "each." For example, "each member is associated with element A" does not imply that all members are associated with an element A. Instead, the term "each" only implies that a member (of some of the members), in a singular form, is associated with an element A.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

What is claimed is:

1. A computer-implemented method for programmatically synchronizing a first set of data schemas associated with a computing server and a second data schema associated with a third-party server, comprising:

receiving the first set of data schemas that include a plurality of schemas, the plurality of schemas comprising a first schema corresponding to a first domain belonging to an organization and a second schema corresponding to a second domain belonging to the organization, the first schema defining a first set of externally defined tabular fields and the second schema defining a second set of externally defined tabular fields;

receiving, from the third-party server that operates independently of the computing server, the second data schema that is required to be used in the third-party server;

synchronizing, by the computing server, a server-defined structure for the first set of the plurality of schemas based on the second data schema received from the third-party server, wherein synchronizing the server-defined structure comprises:

identifying a first field that is in the first set of externally defined tabular fields and a second field that is the second set of externally defined tabular fields, retrieving a third field that is in the second data schema that is required to be used in the third-party server, and maintaining, in the server-defined structure, a mapping that the first field and the second field both mapped to the third field that is in the second data schema that is required to be used in the third-party server;

receiving, at the computing server, a selection of a parameter-assigning rule of the organization, the parameter-assigning rule being associated with a server-defined structure associated with the computing server, the server-defined structure being independent of the plurality of schemas used by the third-party server, the parameter-assigning rule automatically assigning at least one data parameter to records, the records comprising at least one externally defined tabular field;

recording a first occurrence of a first instance of transaction and a second occurrence of a second instance of transaction that are associated with the organization, wherein the first instance and the second instance are processed as transactions that belong to the organization and are processed according to the server-defined structure;

creating a first data record corresponding to the first instance and a second data record corresponding to the second instance, both the first data record and the second data record automatically assigned with data parameters according to the parameter-assigning rule of the organization associated with the server-defined structure;

determining that the first data record belongs to the first domain and that the second data record belongs to the second domain based on the automatically assigned data parameters;

causing to display, at a graphical user interface, a collection of data records, the collection of data records including the first data record, wherein the collection is displayed with one or more externally defined tabular fields that are defined by the first schema used by the third-party server, wherein one or more values for the externally defined tabular fields are pre-filled based on one or more parameter-assigning rules of the first domain to which the first data record belongs, wherein the graphical user interface allows the one or more values to be manually edited;

receiving a request to export the collection of data records to the third-party server; and creating a payload for the third-party server, creating the payload comprising applying the mapping the server-defined structure to map the first field and the second field to the third field that is in the second data schema that is required to be used in the third-party server, the payload comprising the data records of the transactions that belong to the organization, wherein the payload comprises (1) a first subset of data records that includes the first data record that is automatically assigned in the third-party server to the first domain and (2) a second subset of data records that includes the second data record that is automatically assigned in the third-party server to the second domain, wherein the first subset of data records in the payload comprises one or more third party externally defined tabular fields in the first set defined by the first schema and converted from the server-defined structure that was independent of the first schema and wherein the second subset of data records in the payload comprises one or more externally defined tabular fields in the second set defined by the second schema and converted from the server-defined structure that was independent of the first schema.

2. The computer-implemented method of claim 1, wherein determining that the first data record belongs to the first domain and that the second record belongs to the second domain comprises:

selecting the first domain from a list of domains based on a specific unique identifier associated with the transaction.

3. The computer-implemented method of claim 1, further comprising:

receiving, from the third-party server, a set of available values for a specific externally defined tabular field, the set of available values corresponding to values available in the third-party server to be assigned to the specific externally defined tabular field, wherein determining the one or more values for the set of externally defined tabular fields comprises selecting a value from the set of available values received from the third-party server.

4. The computer-implemented method of claim 1, wherein creating the payload for the third-party server comprises generating an export file based at least on the one or more values for the set of externally defined tabular fields, and further comprising:

sending the export file to the third-party server to instruct the third-party server to create a third-party data record according to values stored in the export file.

5. The computer-implemented method of claim 1, further comprising:

sending an API call to the third-party server to instruct the third-party server to create a third-party data record based at least on the created payload.

6. The computer-implemented method of claim 1, further comprising:

receiving, from a client device, a selection of a new domain for the first data record; and responsive to receiving the selection of the new domain, determining one or more new values for the set of externally defined tabular fields based on the new domain.

7. The computer-implemented method of claim 1, further comprising:

receiving, from a client device, a selection of a new domain for the first data record; and responsive to receiving the selection of the new domain, for each externally defined tabular field of the first data record:

determining whether a value assigned to the externally defined tabular field is included in a list of available values received from the third-party server, and responsive to determining that the value assigned to the externally defined tabular field is not included in the list of available values, deleting the value from the externally defined tabular field.

8. The computer-implemented method of claim 1, wherein the first instance of transaction is a transaction corresponds to a virtual credit card.

9. A non-transitory computer readable medium configured to store computer code for programmatically synchronizing a first set of data schemas associated with a computing server and a second data schema associated with a third-party server, the computer code comprising instructions, the instructions when executed by a processor, causes the processor to:

receive the first set of data schemas that include a plurality of schemas, the plurality of schemas comprising a first schema corresponding to a first domain belonging to an organization and a second schema corresponding to a second domain belonging to the organization, the first schema defining a first set of externally defined tabular fields and the second schema defining a second set of externally defined tabular fields;

receive, from the third-party server that operates independently of the computing server, the second data schema that is required to be used in the third-party server;

synchronize, by the computing server, a server-defined structure for the first set of the plurality of schemas based on the second data schema received from the third-party server, wherein synchronizing the server-defined structure comprises:

identifying a first field that is in the first set of externally defined tabular fields and a second field that is the second set of externally defined tabular fields, retrieving a third field that is in the second data schema that is required to be used in the third-party server, and maintaining, in the server-defined structure, a mapping that the first field and the second field both mapped to the third field that is in the second data schema that is required to be used in the third-party server;

receive, at the computing server, a selection of a parameter-assigning rule of the organization, the parameter-assigning rule being associated with a server-defined structure associated with the computing server, the server-defined structure being independent of the plurality of schemas used by the third-party server, the parameter-assigning rule automatically assigning at least one data parameter to records, the records comprising at least one externally defined tabular field;

record a first occurrence of a first instance of transaction and a second occurrence of a second instance of transaction that are associated with the organization, wherein the first instance and the second instance are processed as transactions that belong to the organization and are processed according to the server-defined structure;

create a first data record corresponding to the first instance and a second data record corresponding to the second instance, both the first data record and the second data record automatically assigned with data parameters according to the parameter-assigning rule of the organization associated with the server-defined structure;

determine that the first data record belongs to the first domain and that the second data record belongs to the second domain based on the automatically assigned data parameters;

cause to display, at a graphical user interface, a collection of data records, the collection of data records including the first data record, wherein the collection is displayed with one or more externally defined tabular fields that are defined by the first schema used by the third-party server, wherein one or more values for the externally defined tabular fields are pre-filled based on one or more parameter-assigning rules of the first domain to which the first data record belongs, wherein the graphical user interface allows the one or more values to be manually edited;

receive a request to export the collection of data records to the third-party server; and create a payload for the third-party server, creating the payload comprising applying the mapping the server-defined structure to map the first field and the second field to the third field that is in the second data schema that is required to be used in the third-party server, the payload comprising the data records of the transactions that belong to the organization, wherein the payload comprises (1) a first subset of data records that includes the first data record that is automatically assigned in the third-party server to the first domain and (2) a second subset of data records that includes the second data record that is automatically assigned in the third-party server to the second domain, wherein the first subset of data records in the payload comprises one or more externally defined tabular fields in the first set defined by the first schema and converted from the server-defined structure that was independent of the first schema and wherein the second subset of data records in the payload comprises one or more externally defined tabular fields in the second set defined by the second schema and converted from the server-defined structure that was independent of the first schema.

10. The non-transitory computer readable medium of claim 9, wherein the instructions that cause the processor to determine that the first data record belongs to the first domain and that the second record belongs to the second domain comprises instructions to:

select the first domain from a list of domains based on a specific unique identifier associated with the transaction.

11. The non-transitory computer readable medium of claim 9, wherein the instructions when executed by the processor, further causes the processor to:

receive, from the third-party server, a set of available values for a specific externally defined tabular field, the set of available values corresponding to values available in the third-party server to be assigned to the specific externally defined tabular field, wherein determining the one or more values for the set of externally defined tabular fields comprises selecting a value from the set of available values received from the third-party server.

12. The non-transitory computer readable medium of claim 9, wherein the instructions that cause the processor to create the payload corresponding to the collection of data records for the third-party server comprises instructions to generate an export file based at least on the one or more values for the set of externally defined tabular fields, and further comprising:

send the export file to the third-party server to instruct the third-party server to create a third-party data record according to values stored in the export file.

13. The non-transitory computer readable medium of claim 9, wherein the instructions when executed by the processor, further causes the processor to:

send an API call to the third-party server to instruct the third-party server to create a third-party data record based at least on the created payload.

14. The non-transitory computer readable medium of claim 9, wherein the instructions when executed by the processor, further causes the processor to:

receive, from a client device, a selection of a new domain for the first data record; and responsive to receiving the selection of the new domain, determine one or more new values for the set of externally defined tabular fields based on the new domain.

15. The non-transitory computer readable medium of claim 9, wherein the instructions when executed by the processor, further causes the processor to:

receive, from a client device, a selection of a new domain for the first data record; and responsive to receiving the selection of the new domain, for each externally defined tabular field of the first data record:

determine whether a value assigned to the externally defined tabular field is included in a list of available values received from the third-party server, and responsive to determining that the value assigned to the externally defined tabular field is not included in the list of available values, delete the value from the externally defined tabular field.

16. A system or programmatically synchronizing a first set of data schemas associated with a computing server and a second data schema associated with a third-party server comprising:

a graphical user interface (GUI) configured to display transaction records for transactions performed by an organization; and the computing server in communication with the GUI, the computing server comprising a processor and memory, the memory configured to store a set of code instructions, the set of code instructions, when executed by the processor, causes the processor to:

receive the first set of data schemas that include a plurality of schemas, the plurality of schemas comprising a first schema corresponding to a first domain belonging to an organization and a second schema corresponding to a second domain belonging to the organization, the first schema defining a first set of externally defined tabular fields and the second schema defining a second set of externally defined tabular fields;

receive, from the third-party server that operates independently of the computing server, the second data schema that is required to be used in the third-party server;

synchronize, by the computing server, a server-defined structure for the first set of the plurality of schemas based on the second data schema received from the third-party server, wherein synchronizing the server-defined structure comprises:

identifying a first field that is in the first set of externally defined tabular fields and a second field that is the second set of externally defined tabular fields, retrieving a third field that is in the second data schema that is required to be used in the third-party server, and maintaining, in the server-defined structure, a mapping that the first field and the second field both mapped to the third field that is in the second data schema that is required to be used in the third-party server;

receive, at the computing server, a selection of a parameter-assigning rule of the organization, the parameter-assigning rule being associated with a server-defined structure associated with the computing server, the server-defined structure being independent of the plurality of schemas used by the third-party server, the parameter-assigning rule automatically assigning at least one data parameter to records, the records comprising at least one externally defined tabular field;

record a first occurrence of a first instance of transaction and a second occurrence of a second instance of transaction that are associated with the organization, wherein the first instance and the second instance are processed as transactions that belong to the organization and are processed according to the server-defined structure;

create a first data record corresponding to the first instance and a second data record corresponding to the second instance, both the first data record and the second data record automatically assigned with data parameters according to the parameter-assigning rule of the organization associated with the server-defined structure;

determine that the first data record belongs to the first domain and that the second data record belongs to the second domain based on the automatically assigned data parameters;

cause to display, at a graphical user interface, a collection of data records, the collection of data records including the first data record, wherein the collection is displayed with one or more externally defined tabular fields that are defined by the first schema used by the third-party server, wherein one or more values for the externally defined tabular fields are pre-filled based on one or more parameter-assigning rules of the first domain to which the first data record belongs, wherein the graphical user interface allows the one or more values to be manually edited;

receive a request to export the collection of data records to the third-party server; and create a payload for the third-party server, creating the payload comprising applying the mapping the server-defined structure to map the first field and the second field to the third field that is in the second data schema that is required to be used in the third-party server, the payload comprising the data records of the transactions that belong to the organization, wherein the payload comprises (1) a first subset of data records that includes the first data record that is automatically assigned in the third-party server to the first domain and (2) a second subset of data records that includes the second data record that is automatically assigned in the third-party server to the second domain, wherein the first subset of data records in the payload comprises one or more externally defined tabular fields in the first set defined by the first schema and converted from the server-defined structure that was independent of the first schema and wherein the second subset of data records in the payload comprises one or more externally defined tabular fields in the second set defined by the second schema and converted from the server-defined structure that was independent of the first schema.

17. The system of claim 16, wherein the instructions that cause the processor to determine that the first data record belongs to the first domain and that the second record belongs to the second domain comprises instructions to:

select the first domain from a list of domains based on a specific unique identifier associated with the transaction.

18. The system of claim 16, wherein the instructions when executed by the processor, further causes the processor to:

receive, from the third-party server, a set of available values for a specific externally defined tabular field, the set of available values corresponding to values available in the third-party server to be assigned to the specific externally defined tabular field, wherein determining the one or more values for the set of externally defined tabular fields comprises selecting a value from the set of available values received from the third-party server.

19. The system of claim 16, wherein the instructions that cause the processor to create the payload corresponding to the collection of data records for the third-party server comprises instructions to generate an export file based at least on the one or more values for the set of externally defined tabular fields, and further comprising:

send the export file to the third-party server to instruct the third-party server to create a third-party data record according to values stored in the export file.

20. The system of claim 16, wherein the instructions when executed by the processor, further causes the processor to:

receive, from a client device, a selection of a new domain for the first data record; and responsive to receiving the selection of the new domain, for each externally defined tabular field of the first data record:

determine whether a value assigned to the externally defined tabular field is included in a list of available values received from the third-party server, and responsive to determining that the value assigned to the externally defined tabular field is not included in the list of available values, delete the value from the externally defined tabular field.

* * * * *